(12) United States Patent
Takagi

(10) Patent No.: US 12,415,412 B2
(45) Date of Patent: Sep. 16, 2025

(54) UTILITY VEHICLE

(71) Applicant: KAWASAKI MOTORS, LTD., Hyogo (JP)

(72) Inventor: Jun Takagi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 37 days.

(21) Appl. No.: 17/992,394

(22) Filed: Nov. 22, 2022

(65) Prior Publication Data

US 2024/0166041 A1 May 23, 2024

(51) Int. Cl.
| | |
|---|---|
| *B60K 5/04* | (2006.01) |
| *B60H 1/32* | (2006.01) |
| *B60K 5/12* | (2006.01) |
| *B60K 17/04* | (2006.01) |
| *B60K 17/22* | (2006.01) |
| *F01M 11/00* | (2006.01) |
| *F01M 11/02* | (2006.01) |

(52) U.S. Cl.
CPC ............ *B60K 5/04* (2013.01); *B60H 1/3229* (2013.01); *B60K 5/1208* (2013.01); *B60K 17/04* (2013.01); *B60K 17/22* (2013.01); *F01M 11/0004* (2013.01); *F01M 11/02* (2013.01)

(58) Field of Classification Search
CPC ........ B60K 5/04; B60K 5/1208; B60K 17/04; B60K 17/22; B60H 1/3229; F01M 11/0004; F01M 11/02; F16C 35/02
See application file for complete search history.

(56) References Cited

U.S. PATENT DOCUMENTS

| | | | |
|---|---|---|---|
| 7,650,959 B2 * | 1/2010 | Kato | B60G 7/02 180/311 |
| 8,875,833 B2 | 11/2014 | Kouma et al. | |
| 2004/0154851 A1 * | 8/2004 | Massicotte | B62M 27/02 180/190 |
| 2015/0086145 A1 * | 3/2015 | Kim | F16C 35/02 384/441 |
| 2017/0182877 A1 * | 6/2017 | Gillespie | B60K 5/1283 |
| 2019/0023115 A1 * | 1/2019 | Mackenzie | B60K 6/387 |

FOREIGN PATENT DOCUMENTS

JP 4221694 B2 * 2/2009

* cited by examiner

*Primary Examiner* — Syed O Hasan
(74) *Attorney, Agent, or Firm* — Wenderoth, Lind & Ponack, L.L.P.

(57) ABSTRACT

A utility vehicle includes a vehicle body frame, a traveling drive source, a mount bracket for mounting the traveling drive source on the vehicle body frame, and a related component connected to the traveling drive source. The related component is supported by the mount bracket.

19 Claims, 20 Drawing Sheets

UTILITY VEHICLE

BACKGROUND OF THE INVENTION

Technical Field

The present disclosure relates to a utility vehicle.

Related Art

As described in U.S. Pat. No. 8,875,833, a utility vehicle includes an engine arranged at a vehicle body rear portion and a transmission arranged behind the engine. In the utility vehicle, power from the engine is transmitted to a rear wheel through the transmission, and is transmitted to a front wheel through a propeller shaft arranged on the vehicle body right side of the engine.

SUMMARY

A utility vehicle according to one aspect of the present disclosure includes a vehicle body frame, a traveling drive source, a mount bracket for mounting the traveling drive source on the vehicle body frame, and a related component connected to the traveling drive source. The related component is supported by the mount bracket.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, a utility vehicle according to an embodiment of the present disclosure will be described with reference to the accompanying drawings. The utility vehicle is mainly a vehicle for traveling not only on grassland, gravel, and sand, but also on unpaved mountain roads and forest roads, and off-road places, such as muddy and rocky lands. Note that, in the present description, "front", "rear", "left", and "right" refer to a front direction, a rear direction, a left direction, and a right direction as viewed from a driver on the utility vehicle.

Figure 1:
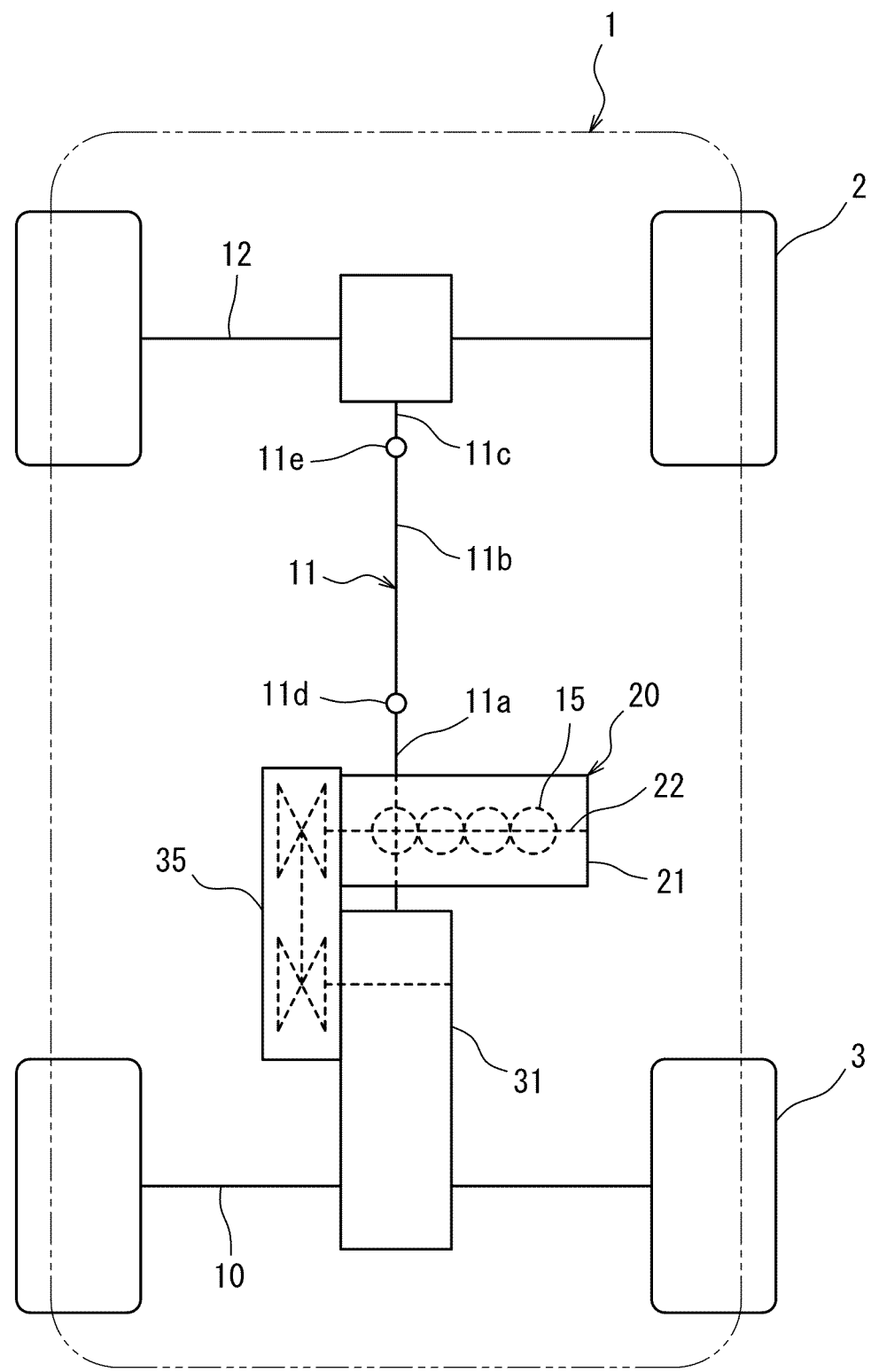
FIG. 1 is a schematic configuration diagram of a utility vehicle.
Figure 2:
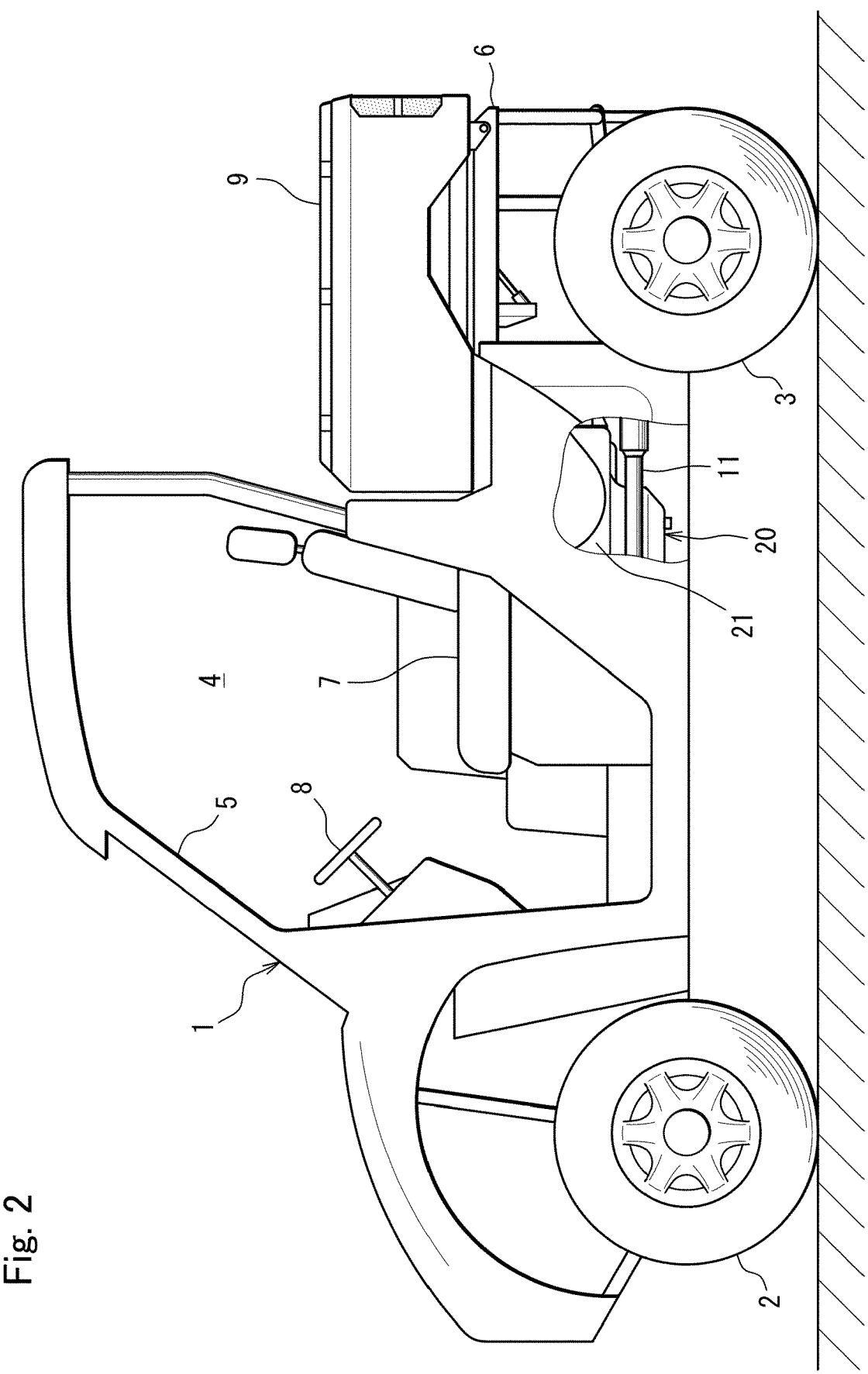
FIG. 2 is a schematic side view of the utility vehicle.

FIG. 1 is a schematic configuration diagram of the utility vehicle, and FIG. 2 is a schematic side view of the utility vehicle. As illustrated in FIGS. 1 and 2, a utility vehicle 1 according to an embodiment of the present disclosure includes a pair of left and right front wheels 2 at a vehicle body front portion and a pair of left and right rear wheels 3 at a vehicle body rear portion. A riding space (vehicle interior) 4 where passengers including a driver get in is provided between the front wheels 2 and the rear wheels 3.

The riding space 4 is surrounded by a ROPS 5. The ROPS 5 is an abbreviation for a rollover protection structure and is part of a vehicle body frame 6. A seat 7 is arranged in the riding space 4, and an operation unit 8 such as a steering wheel is provided in front of the seat 7.

A cargo bed 9 is provided behind the riding space 4. The cargo bed 9 is arranged in a vehicle body rear portion, and a power unit 20 including an engine 21 as a traveling drive source and a transmission 31 is arranged below the cargo bed 9. A driving force from the engine 21 is transmitted to the front wheels 2 and the rear wheels 3 via the transmission 31.

Figure 5:
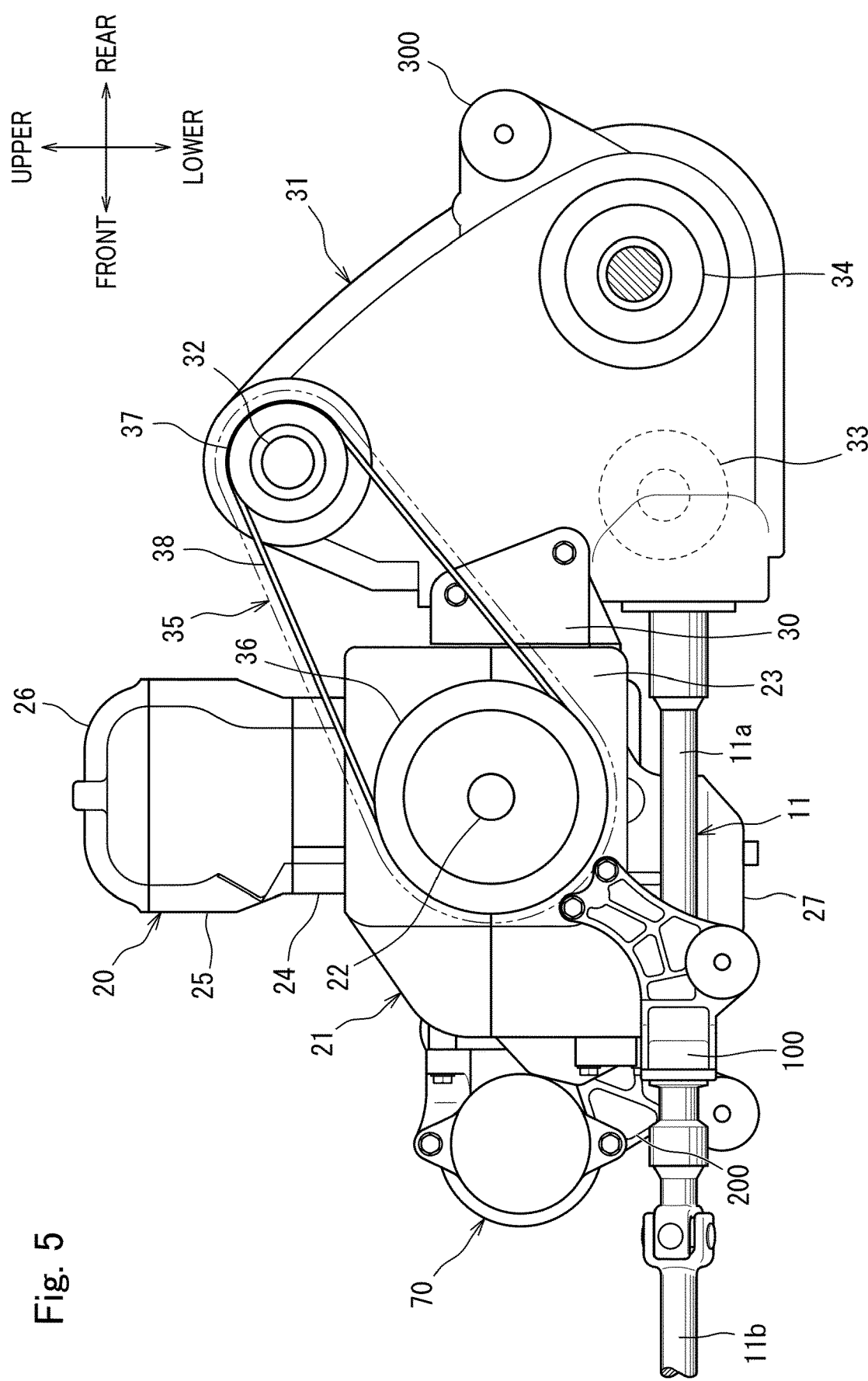
FIG. 5 is a left side view of the power unit.

As illustrated in FIG. 5 described later, the engine 21 includes a crankshaft 22 extending in a vehicle width direction, a crankcase 23 supporting the crankshaft 22 from below, a cylinder block 24 attached to an upper surface of the crankcase 23, having a plurality of cylinders 15, and supporting the crankshaft 22 from above, a cylinder head 25 attached to an upper surface of the cylinder block 24, a head cover 26 attached to an upper surface of the cylinder head 25, and an oil pan 27 attached to a lower surface of the crankcase 23. The engine 21 is a multi-cylinder engine, specifically, a parallel four-cylinder engine in which four of the cylinders 15 are arranged in parallel in the vehicle width direction. In the cylinder block 24, four of the cylinders 15 are formed side by side in the vehicle width direction.

The transmission 31 is arranged behind the engine 21 and is connected to the engine 21 via a connecting bracket 30. Power from the engine 21 is transmitted to the transmission 31 by a belt converter 35 as a power transmission mechanism that transmits power from the engine 21 to the transmission 31. The belt converter 35 is arranged on the vehicle body left side which is one side in the vehicle width direction of the engine 21 and the transmission 31.

The belt converter 35 includes a drive side pulley 36 attached to the crankshaft 22 which is an output shaft of the engine 21, a driven side pulley 37 attached to an input shaft 32 of the transmission 31, and a V belt 38 wound around the drive side pulley 36 and the driven side pulley 37. The belt converter 35 is a V-belt type continuously variable transmission, and is automatically changed in speed in accordance with a rotational speed of the engine 21 or the like.

The transmission 31 includes the input shaft 32 to which power from the engine 21 is transmitted, a front wheel output shaft 33 for transmitting power from the engine 21 to the front wheels 2, and a rear wheel output shaft 34 for transmitting power from the engine 21 to the rear wheels 3. The transmission 31 changes the speed of power transmitted to the input shaft 32 from the engine 21 via a transmission mechanism (not illustrated) and transmits the power to the front wheel output shaft 33 and the rear wheel output shaft 34.

A two-wheel drive four-wheel drive switching device (not illustrated) is attached to the transmission 31. The two-wheel drive four-wheel drive switching device is configured to be switchable between a two wheel drive state in which the input shaft 32 and the rear wheel output shaft 34 are connected and a four wheel drive state in which the input shaft 32, the front wheel output shaft 33, and the rear wheel output shaft 34 are connected.

Power from the engine 21 transmitted to the rear wheel output shaft 34 is transmitted to the left and right rear wheels 3 via a rear wheel drive shaft 10 extending in the vehicle width direction. Power from the engine 21 transmitted to the front wheel output shaft 33 is transmitted to a front wheel propeller shaft 11 extending in a vehicle body front-rear direction. Power from the engine 21 transmitted to the front wheel propeller shaft 11 is transmitted to the left and right front wheels 2 via a front wheel drive shaft 12 extending in the vehicle width direction.

Figure 9:
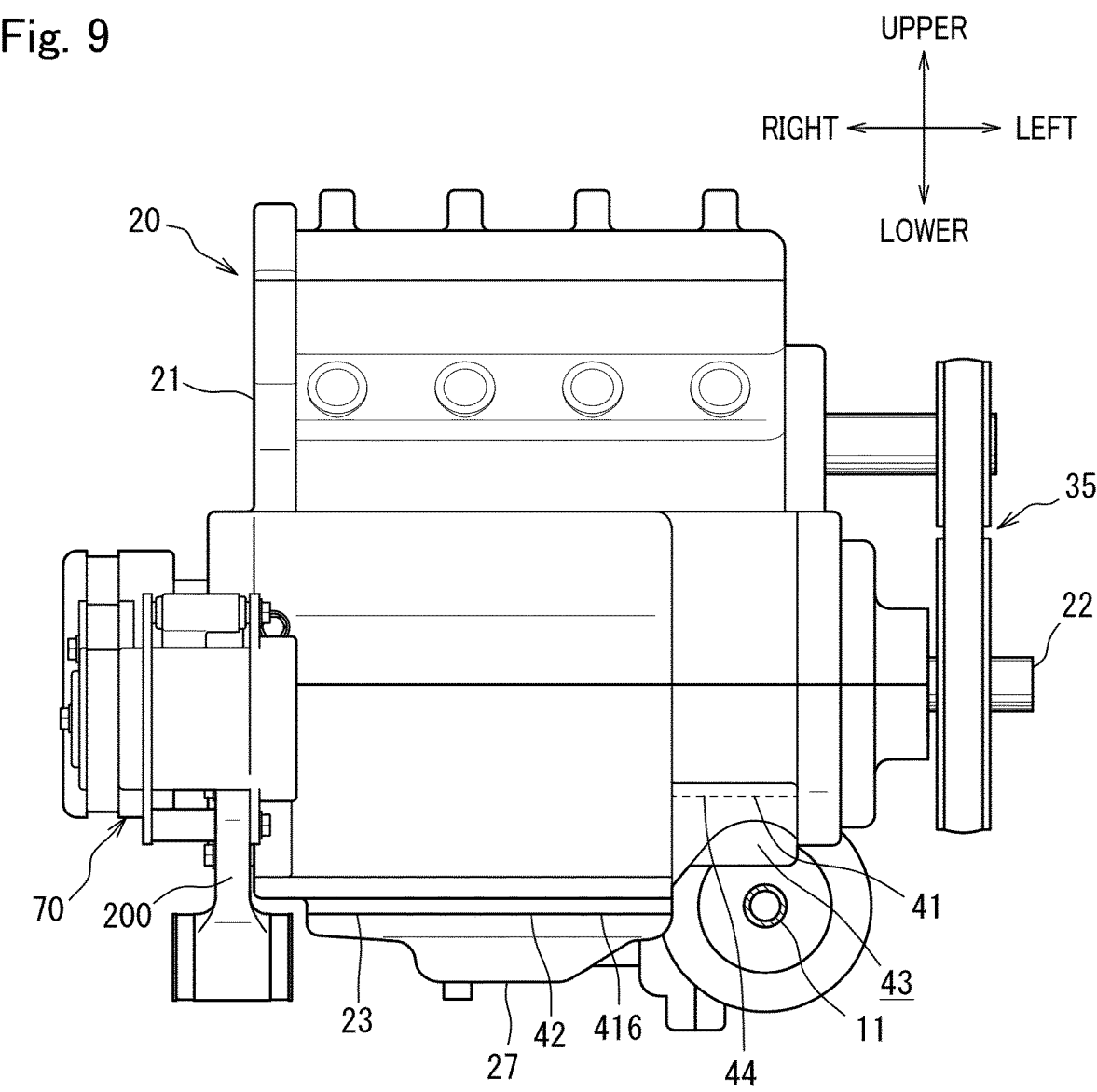
FIG. 9 is a front view of the power unit excluding a first mount bracket.

As illustrated in FIG. 1, the front wheel propeller shaft 11 extends from the transmission 31 arranged behind the engine 21 to the vehicle body front side further than the engine 21, and is arranged below the crankcase 23. As illustrated in FIG. 9 to be described later, the crankcase 23 has a recessed portion 41 in which a lower portion of the crankcase 23 is recessed upward and a remaining portion 42 excluding the recessed portion in an axial direction of the crankshaft 22. At least a part of the front wheel propeller shaft 11 is arranged in a space 43 defined below the recessed portion 41 and is located above a lower end portion of the crankcase 23.

The recessed portion 41 provided in a lower portion of the crankcase 23 is formed at a position corresponding to one of four of the cylinders 15, and the remaining portion 42 provided in a lower portion of the crankcase 23 is formed at a position corresponding to the remaining ones of four of the cylinders 15. In the present embodiment, the recessed portion 41 is formed at a position below one of the cylinders 15 on the vehicle body left side, and the remaining portion 42 is formed at a position below three of the cylinders 15 on the vehicle body right side. At least a part of the front wheel propeller shaft 11 is arranged at a position overlapping the crankcase 23 in a vehicle body vertical direction and the vehicle width direction.

Figure 3:
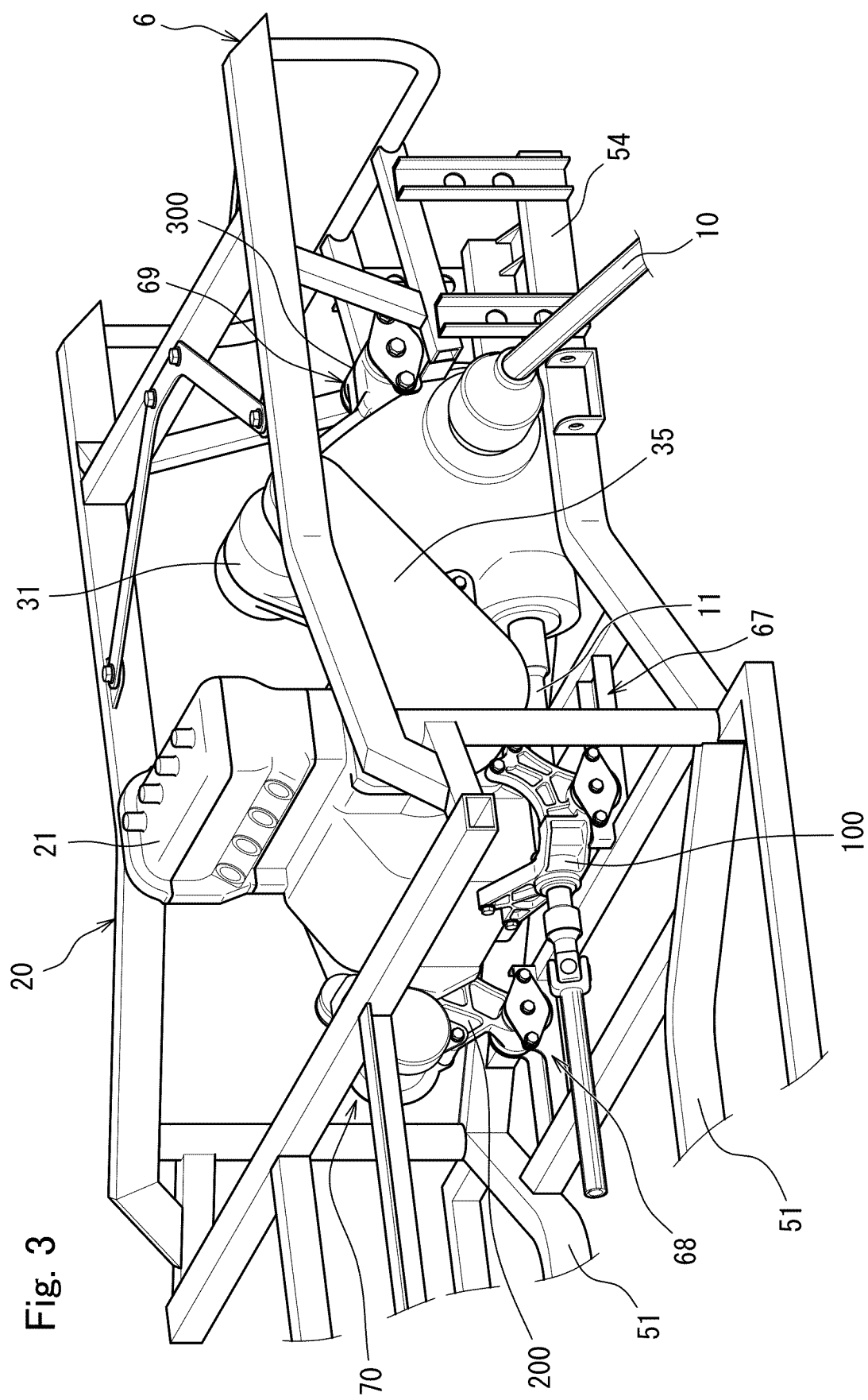
FIG. 3 is a perspective view illustrating a vehicle body frame and a power unit of a vehicle body rear portion.
Figure 4:
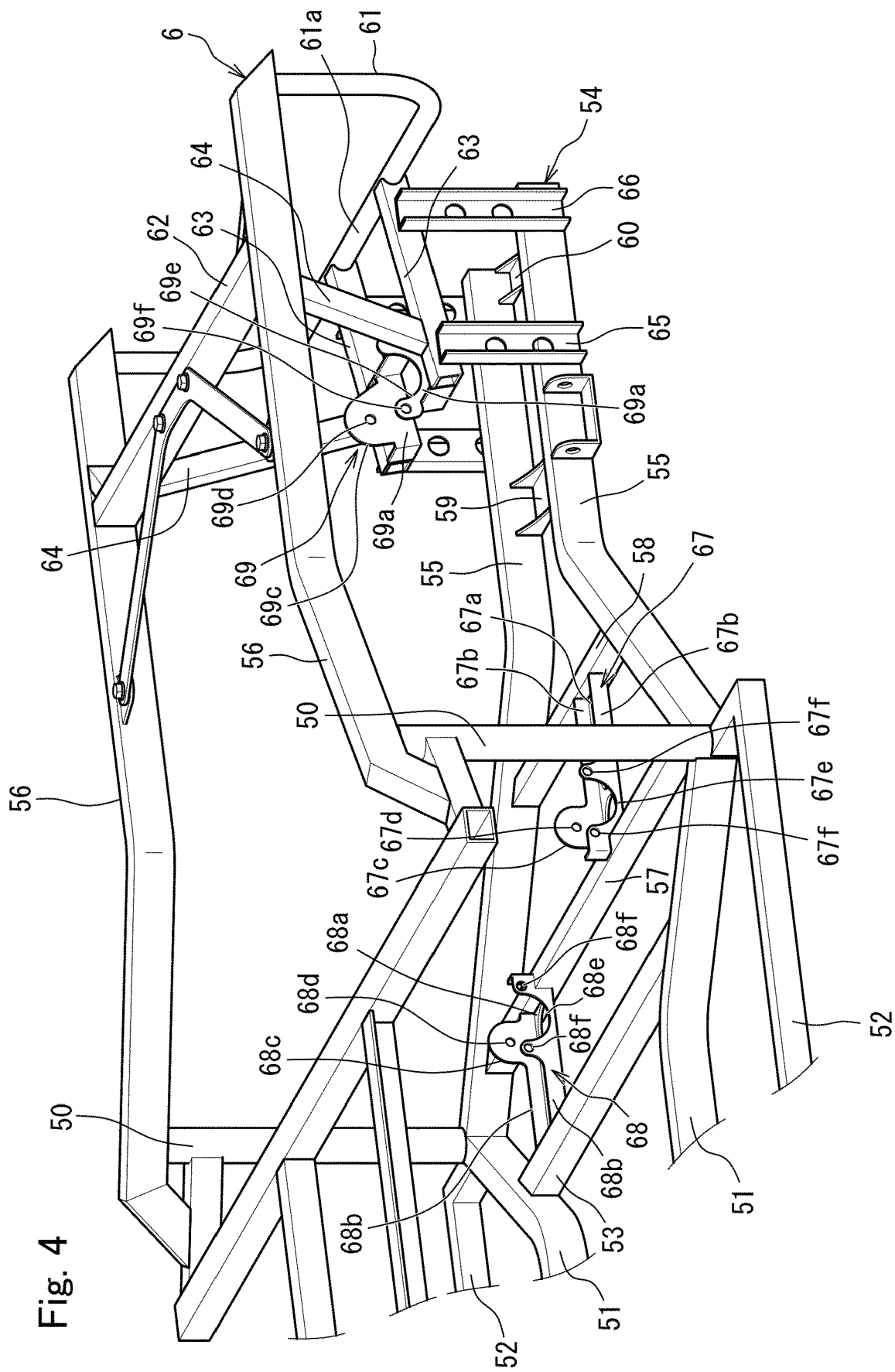
FIG. 4 is a perspective view illustrating a vehicle body frame of a vehicle body rear portion.

FIG. 3 is a perspective view illustrating a vehicle body frame and a power unit of a vehicle body rear portion. FIG. 4 is a perspective view illustrating a vehicle body frame of a vehicle body rear portion. As illustrated in FIG. 3, the power unit 20 including the engine 21 and the transmission 31 is supported by the vehicle body frame 6 constituting a vehicle body rear portion.

As illustrated in FIG. 4, the vehicle body frame 6 includes a pair of left and right main frames 51 extending in the vehicle body front-rear direction, and a pair of left and right side frames 52 arranged outside the left and right main frames 51 in the vehicle width direction and extending in the vehicle body front-rear direction. The main frame 51 has the front side extending linearly and the rear side curved outward in the vehicle width direction toward the rear side. The side frames 52 extend linearly in the vehicle body front-rear direction. The rear sides of the left and right main frames 51 are connected by a floor cross frame 53 extending in the vehicle width direction. The main frame 51 and the side frame 52 support a floor panel.

The vehicle body frame 6 includes a rear frame 54 provided at a rear end portion of the left and right main frames 51. The rear frame 54 includes a pair of left and right lower rear frames 55 extending in the vehicle body front-rear direction from a rear end portion of the left and right main frames 51 to the rear side, a pair of left and right upper rear frames 56 arranged above the left and right lower rear frames 55 and extending in the vehicle body front-rear direction, and left and right front connecting frames 50 respectively connecting front sides of the left and right lower rear frames 55 and upper rear frames 56 and extending in the vehicle body vertical direction.

Each of the left and right lower rear frames 55 and the left and right upper rear frames 56 has the rear side extending linearly, and the front side being curved outward in the vehicle width direction toward the front side. The left and right lower rear frames 55 are connected by first, second, third, and fourth lower cross frames 57, 58, 59, and 60 extending linearly in the vehicle width direction. The first, second, third, and fourth lower cross frames 57, 58, 59, and 60 are arranged apart from each other in the vehicle body front-rear direction.

The vehicle body frame 6 includes a U-shaped frame 61 that is formed in a U-shape extending in the vehicle width direction and protruding downward and connects the rear sides of the left and right upper rear frames 56, and an upper cross frame 62 that linearly extends in the vehicle width direction further on the vehicle body front side than the U-shaped frame 61 and connects the left and right upper rear frames 56.

A pair of left and right rear sub-frames 63 linearly extending to the vehicle body front side is connected to a portion 61a protruding downward of the U-shaped frame 61. The left and right rear sub-frames 63 are arranged between the upper rear frame 56 and the lower rear frame 55 in the vertical direction, and are formed to have a shorter length in the vehicle front-rear direction than the upper rear frame 56 and the lower rear frame 55.

A first vertical frame 64 extending in the vertical direction is connected between each of the left and right rear sub-frames 63 and the left and right upper rear frames 56. A second vertical frame 65 and a third vertical frame 66 extending in the vertical direction are connected between each of the left and right rear sub-frames 63 and the left and right lower rear frames 55.

A first support frame 67 that extends in the vehicle body front-rear direction and supports the engine 21 is attached to the first and second lower cross frames 57 and 58. A second support frame 68 that extends in the vehicle body front-rear direction and supports the engine 21 is attached to the floor cross frame 53 and the first lower cross frame 57. The second support frame 68 is arranged further on the vehicle body right side than the first support frame 67. A third support frame 69 that extends in the vehicle width direction and supports the engine 21 is attached to the left and right rear sub-frames 63.

As illustrated in FIG. 3, the engine 21 is supported by the vehicle body frame 6 using mount brackets 100 and 200 for mounting the engine 21 on the vehicle body frame 6. The engine 21 is supported by the vehicle body frame 6 in a manner that the first mount bracket 100 arranged on the vehicle body left side and the vehicle body front side of the engine 21, the second mount bracket 200 arranged on the vehicle body right side and the vehicle body front side of the engine 21, and a rear mount 300 provided on the vehicle body rear side of the engine 21 are attached to the first support frame 67, the second support frame 68, and the third support frame 69, respectively. The rear mount 300 is provided on the vehicle body rear side of the transmission 31. The rear mount 300 may be provided on the vehicle body rear side of the engine 21 and attached to the vehicle body frame 6.

Figure 6:
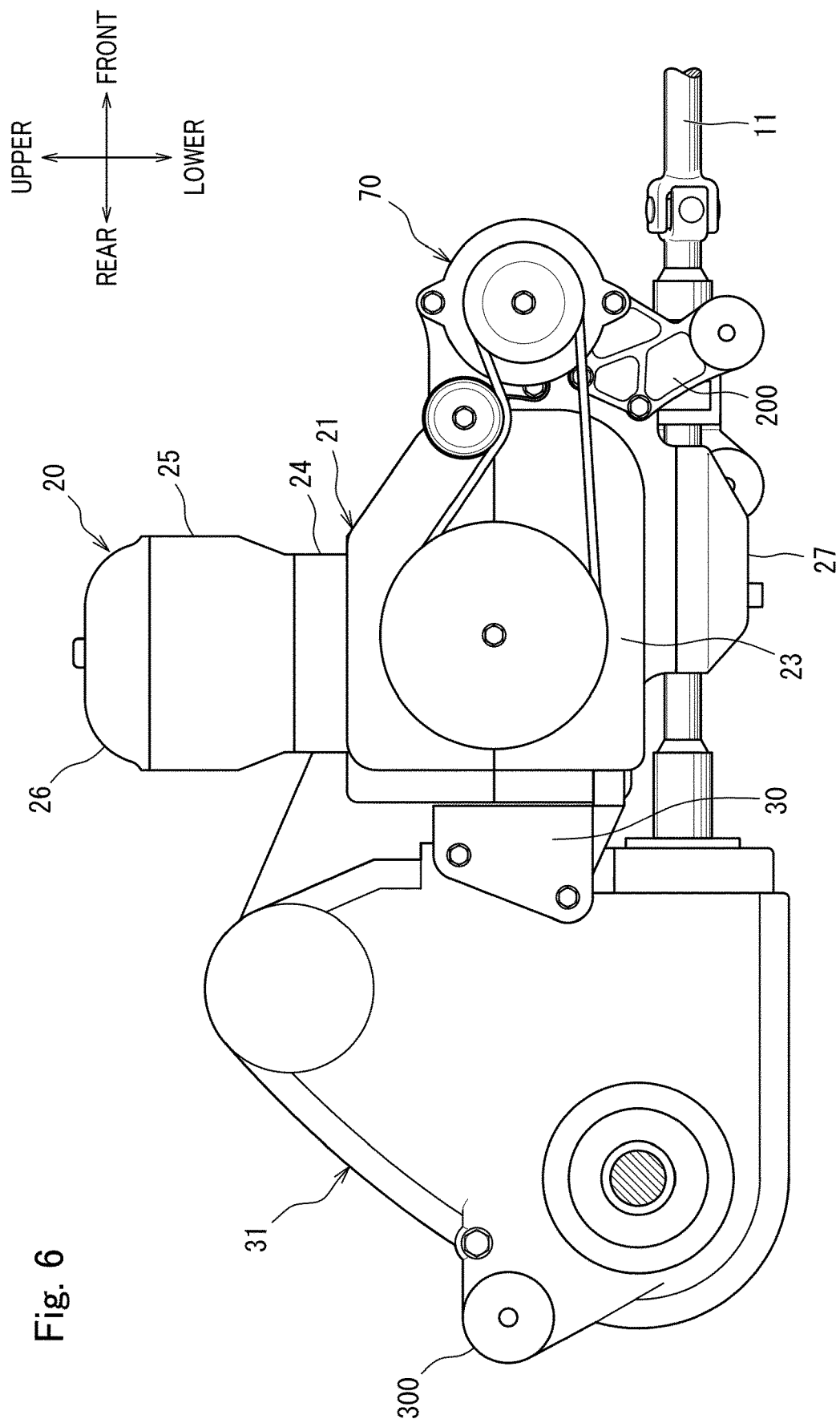
FIG. 6 is a right side view of the power unit.
Figure 7:
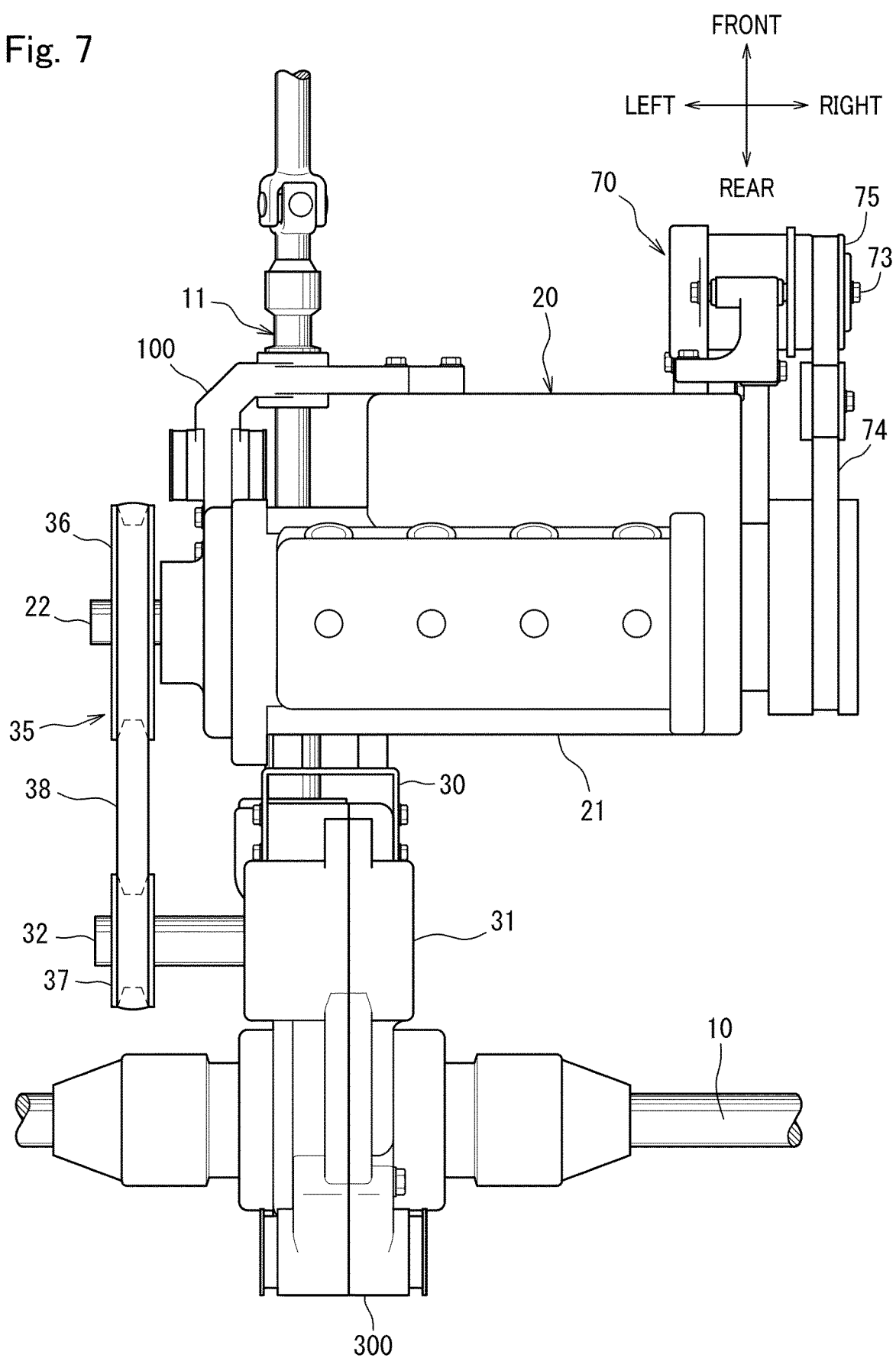
FIG. 7 is a top view of the power unit.
Figure 8:
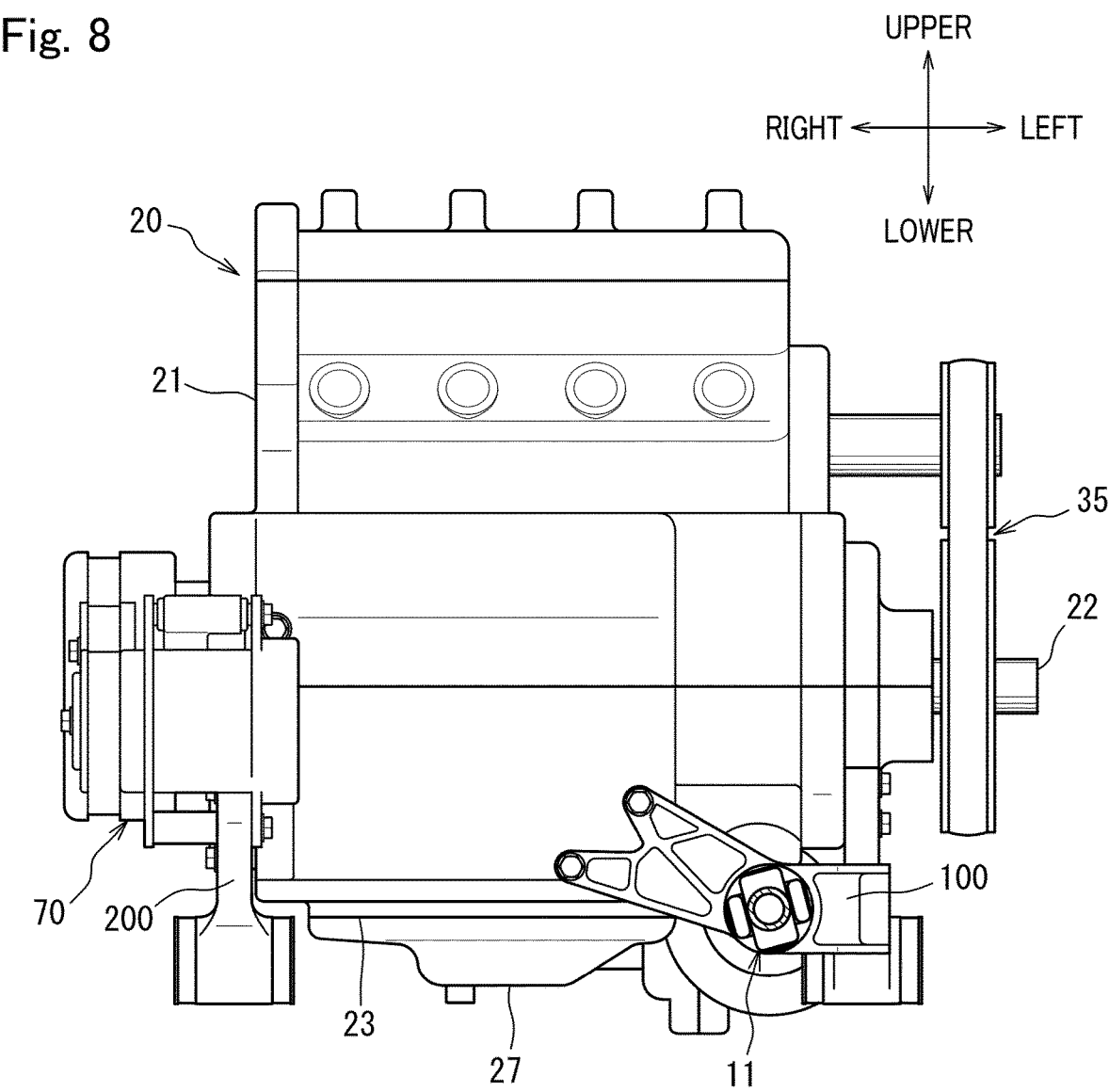
FIG. 8 is a front view of the power unit.

FIG. 5 is a left side view of the power unit, FIG. 6 is a right side view of the power unit, FIG. 7 is a top view of the power unit, and FIG. 8 is a front view of the power unit. FIG. 9 is a front view of the power unit excluding the first mount bracket. As illustrated in FIGS. 5 to 9, the power unit 20 includes the engine 21 and the transmission 31, and the engine 21 and the transmission 31 are connected via the connecting bracket 30.

As illustrated in FIG. 7, the front wheel propeller shaft 11 is arranged below the engine 21, and is arranged at a position overlapping the engine 21 in the vehicle front-rear direction and the vehicle width direction in plan view. As illustrated in FIG. 5, the front wheel propeller shaft 11 is arranged at a position overlapping the engine 21 in the vehicle body vertical direction in a side view (i.e., when viewed from above the vehicle body frame).

As illustrated in FIG. 9, the crankcase 23 has the recessed portion 41 in which a lower portion of the crankcase 23 is recessed upward and the remaining portion 42 excluding the recessed portion 41 in the axial direction of the crankshaft 22. At least a part of the front wheel propeller shaft 11 is arranged in a space 43 defined below the recessed portion 41 and is located above a lower end portion of the crankcase 23.

The oil pan 27 is arranged further on the vehicle body right side than the front wheel propeller shaft 11, and is formed to be shorter than the crankcase 23 in the vehicle width direction. The oil pan 27 is attached to the remaining portion 42 excluding the recessed portion 41 provided in a lower portion of the crankcase 23 in the vehicle width direction.

As described above, the engine 21 is supported by the vehicle body frame 6 in a manner that the first mount bracket 100, the second mount bracket 200, and the rear mount 300 are attached to the first support frame 67, the second support frame 68, and the third support frame 69, respectively.

Figure 10:
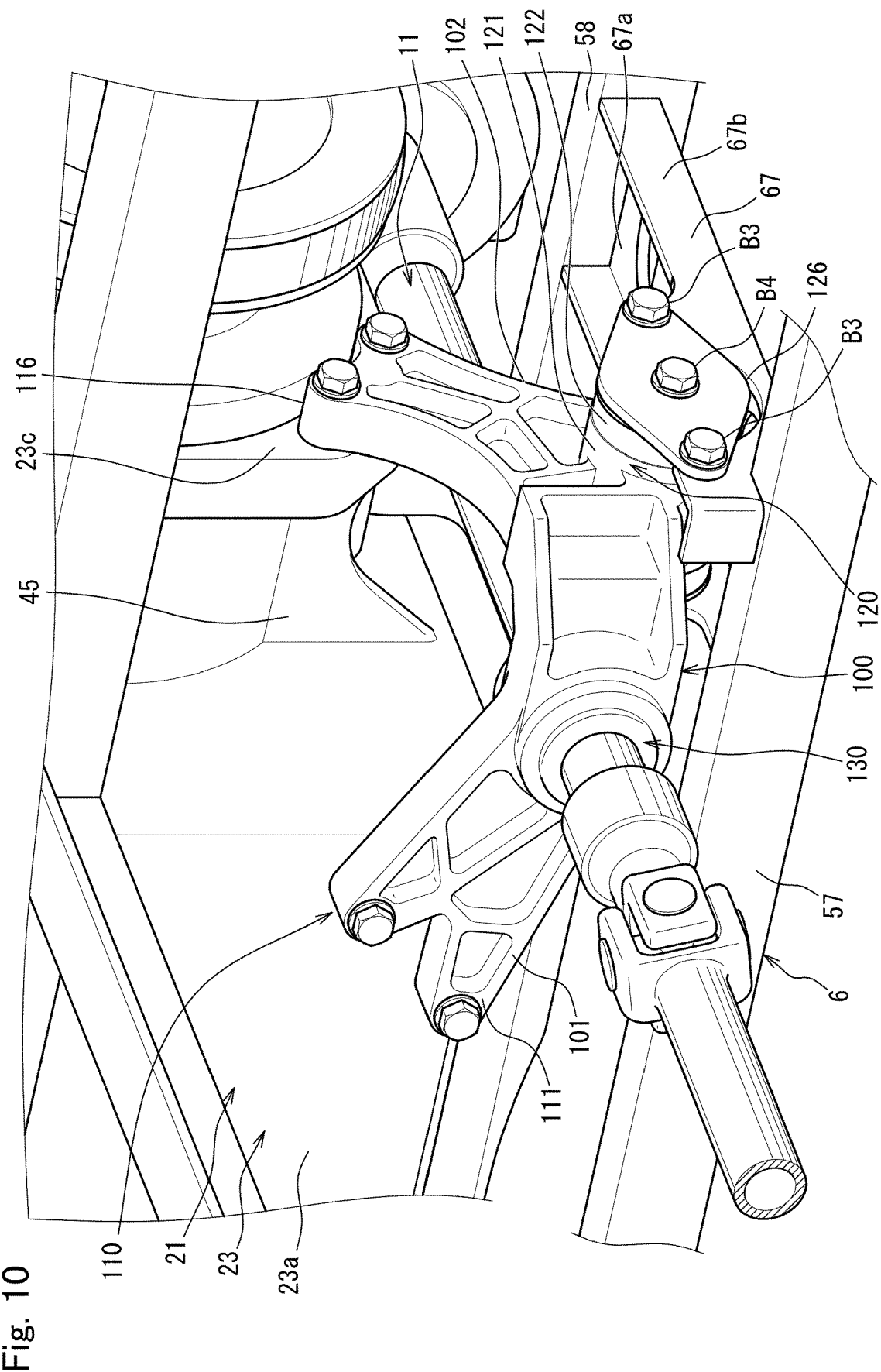
FIG. 10 is a perspective view illustrating the vicinity of the first mount bracket.
Figure 11:
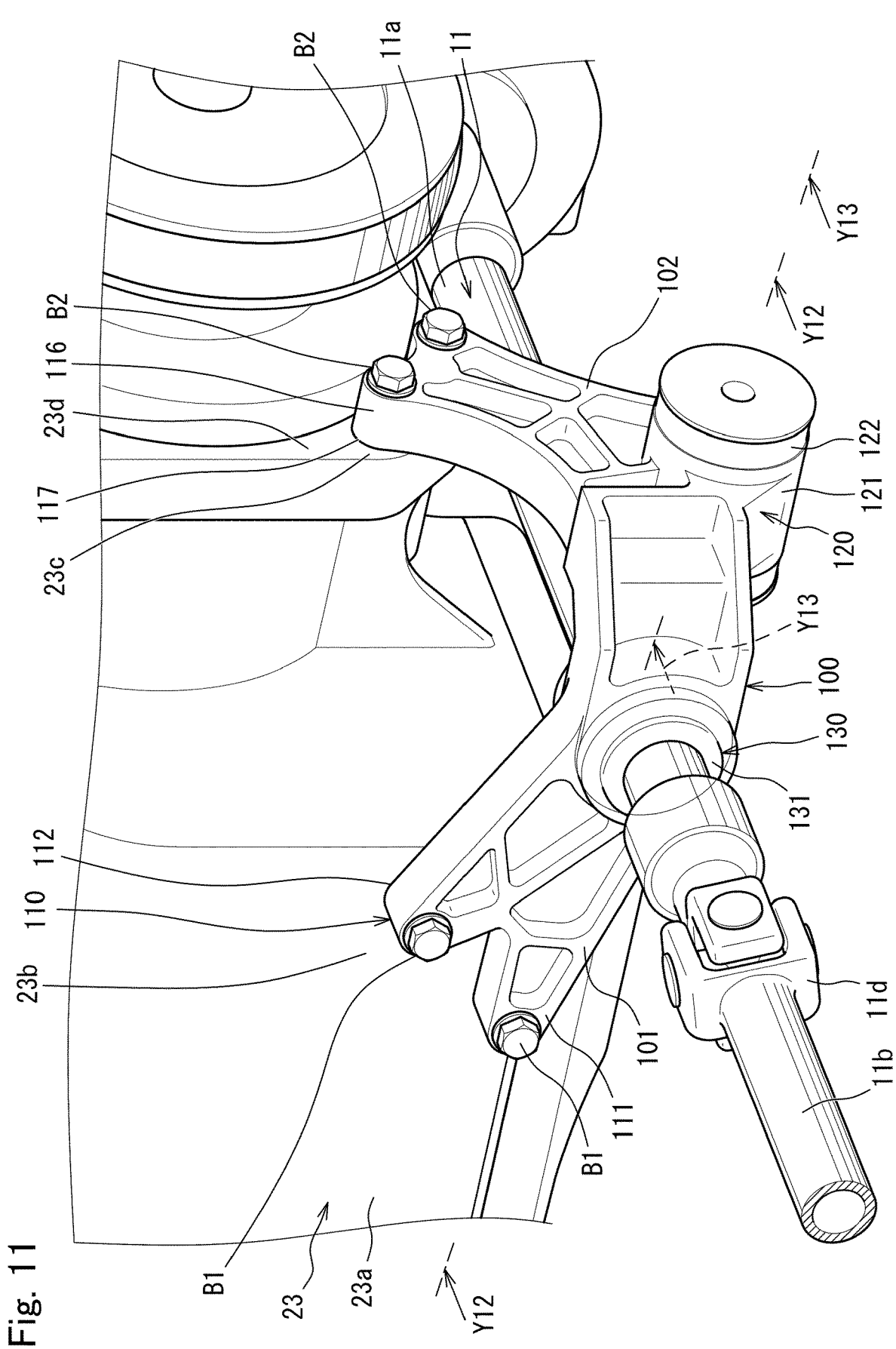
FIG. 11 is a perspective view illustrating the vicinity of the first mount bracket excluding the vehicle body frame.
Figure 12:
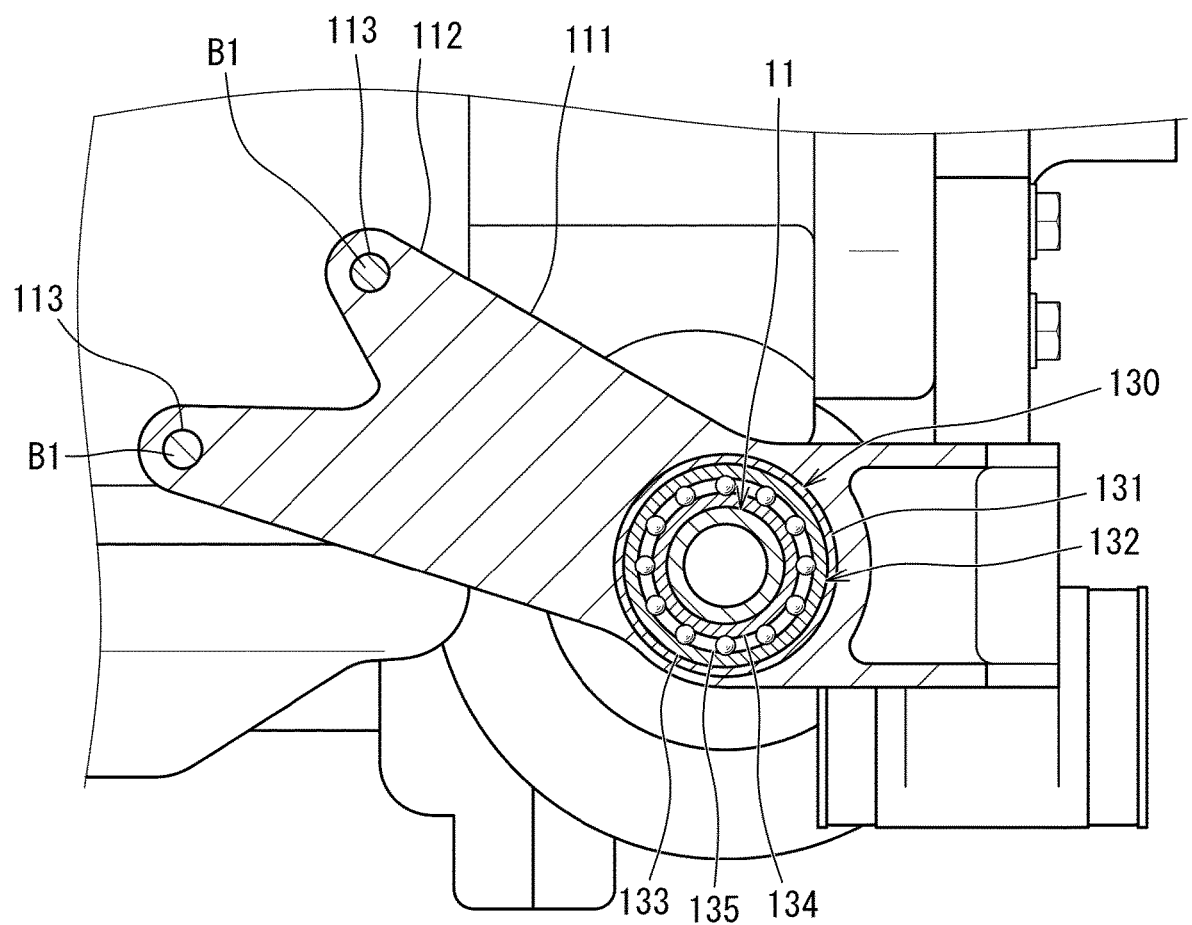
FIG. 12 is a cross-sectional view of the vicinity of the first mount bracket taken along line Y12-Y12 in FIG. 11.
Figure 13:
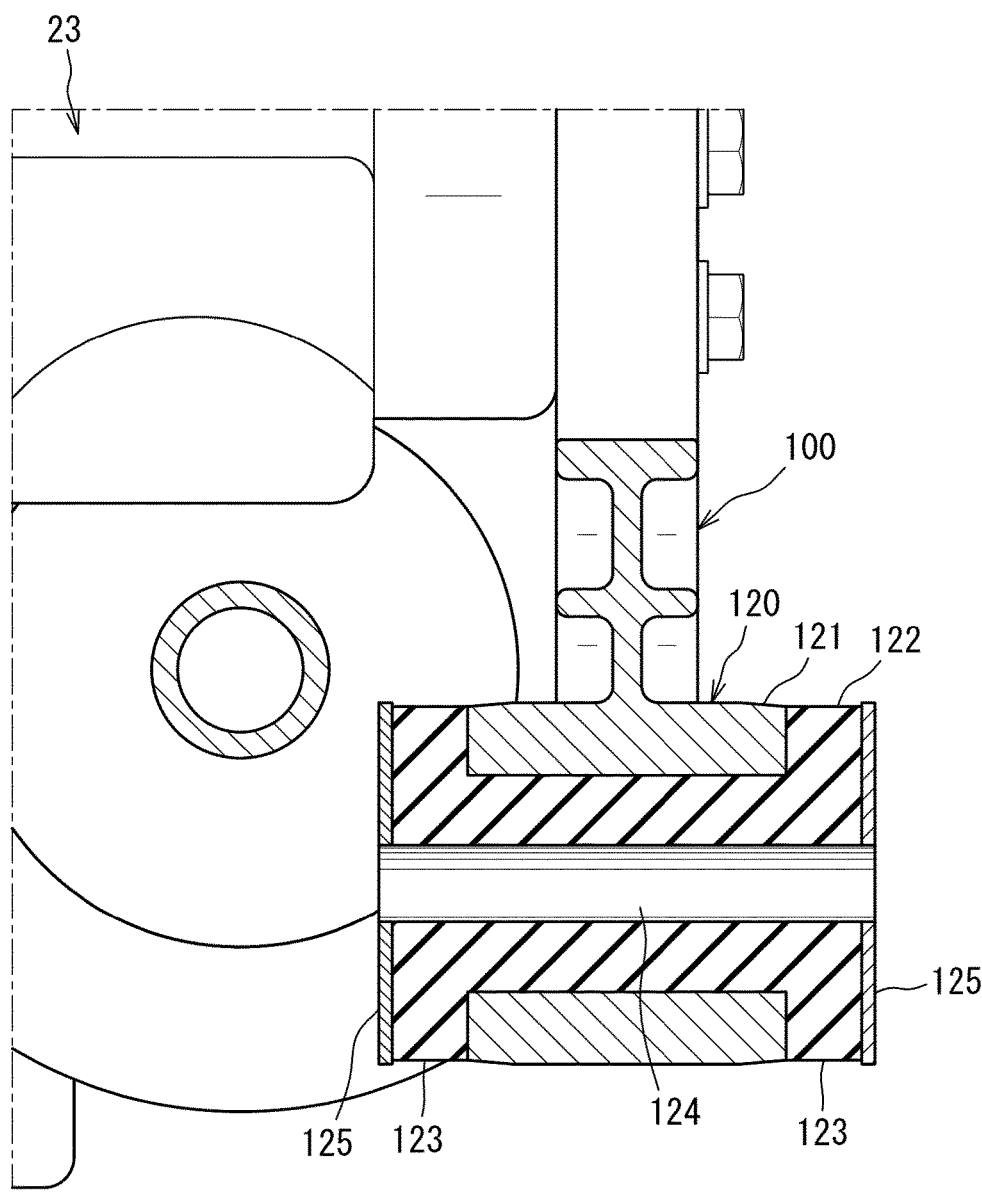
FIG. 13 is a cross-sectional view of the vicinity of the first mount bracket taken along line Y13-Y13 in FIG. 11.

FIG. 10 is a perspective view illustrating the vicinity of the first mount bracket, FIG. 11 is a perspective view illustrating the vicinity of the first mount bracket excluding the vehicle body frame, FIG. 12 is a cross-sectional view of the vicinity of the first mount bracket taken along line Y12-Y12 in FIG. 11, and FIG. 13 is a cross-sectional view of the vicinity of the first mount bracket taken along line Y13-Y13 in FIG. 11.

As illustrated in FIGS. 10 to 13, the first mount bracket 100 includes a front surface portion 101 arranged on the vehicle body front side and extending in the vehicle width direction, and a side surface portion 102 extending from the vehicle body left side of the front surface portion 101 to the vehicle body rear side. The first mount bracket 100 is formed in a substantially L shape in plan view in a manner that the front surface portion 101 and the side surface portion 102 are integrally formed. As illustrated in FIGS. 5 and 8, the first mount bracket 100 is arranged at a position overlapping the crankcase 23 in the vehicle width direction, the vehicle body vertical direction, and the vehicle front-rear direction.

The first mount bracket 100 includes a drive source connection portion 110 connected to the engine 21, a frame connection portion 120 connected to the vehicle body frame 6, and a related component connection portion 130 connected to the front wheel propeller shaft 11 as a related component related to the engine 21. The first mount bracket 100 includes, as the drive source connection portion 110, a front drive source connection portion 111 and a rear drive source connection portion 116 arranged on the vehicle front side and the vehicle body rear side of the first mount bracket 100, respectively.

As illustrated in FIG. 11, the front drive source connection portion 111 is provided on the inner side in the vehicle width direction of the front surface portion 101 of the first mount bracket 100. The front drive source connection portion 111 includes an attachment surface portion 112 formed on the vehicle body rear side of the front surface portion 101 and two bolt insertion holes 113 extending through the attachment surface portion 112 in the front-rear direction. The two bolt insertion holes 113 are arranged to be offset in the vertical direction and the vehicle width direction.

In a front surface portion 23a on the vehicle body left side of the crankcase 23, an attachment surface portion 23b extending in a direction substantially orthogonal to the front-rear direction is formed corresponding to the two bolt insertion holes 113 of the front drive source connection portion 111, and two screw holes are formed in the attachment surface portion 23b. The front drive source connection portion 111 is attached to the crankcase 23 as the attachment surface portion 112 of the front drive source connection portion 111 is placed on the attachment surface portion 23b of the crankcase 23 and a fastening bolt B1 is screwed into the screw hole through the bolt insertion hole 113.

The rear drive source connection portion 116 is provided on the vehicle body rear side of the side surface portion 102 of the first mount bracket 100. The rear drive source connection portion 116 includes an attachment surface portion 117 formed on the inner side in the vehicle width direction of the side surface portion 102, and two bolt insertion holes extending through the attachment surface portion 117 in the vehicle width direction. The two bolt insertion holes are arranged to be offset in the vertical direction and the vehicle body front-rear direction.

An attachment surface portion 23d extending in a direction substantially orthogonal to the vehicle width direction is formed on a side surface portion 23c on the vehicle body left side of the crankcase 23 in correspondence with the two bolt insertion holes of the rear drive source connection portion 116, and two screw holes are formed in the attachment surface portion 23d. The rear drive source connection portion 116 is attached to the crankcase 23 as the attachment surface portion 117 of the rear drive source connection portion 116 is placed on the attachment surface portion 23d of the crankcase 23 and a fastening bolt B2 is screwed into the screw hole through the bolt insertion hole.

The frame connection portion 120 is provided in a portion protruding downward on the center side in the front-rear direction of the side surface portion 102 of the first mount bracket 100. The frame connection portion 120 includes a cylindrical portion 121 having an axial center extending in the vehicle width direction on the center side in the front-rear direction of the side surface portion 102, and a rubber bush 122 fitted into the cylindrical portion 121 and formed in a substantially cylindrical shape.

As illustrated in FIG. 13, the rubber bush 122 is formed in a substantially cylindrical shape, and has flange portions 123 on both sides protruding radially outward as compared with the center side in the axial direction on both sides in the axial direction. The rubber bush 122 is attached in a manner of being fitted into the cylindrical portion 121 with the flange portions 123 on both sides sandwiching the cylindrical portion 121. A sleeve 124 made from metal formed in a cylindrical shape is joined to the inner side of the rubber bush 122, and an end surface plate 125 made from metal formed in a disk shape is joined to each of both end surfaces in the axial direction of the rubber bush 122.

As illustrated in FIG. 4, the first support frame 67 includes a bottom surface portion 67a and side surface portions 67b on both sides, and is formed in a substantially U shape when viewed from the vehicle body front-rear direction. A bush receiving portion 67c protruding upward corresponding to the end surface plate 125 of the rubber bush 122 is formed in the side surface portion 67b on the vehicle body right side, and a bolt insertion hole 67d is formed in the bush receiving portion 67c. On the side surface portion 67b on the vehicle body left side, a bush accommodating portion 67e recessed downward so as to accommodate the end surface plate 125 of the rubber bush 122 is formed, and two bolt insertion holes 67f are formed in the front-rear direction of the bush accommodating portion 67e.

As illustrated in FIG. 10, an attachment plate 126 is formed in a flat plate shape, and has two bolt insertion holes formed on both sides in the vehicle body front-rear direction and one bolt insertion hole formed on the center side in the vehicle body front-rear direction. The attachment plate 126 is attached to the first support frame 67 with a fastening bolt B3 and a nut as two bolt insertion holes on both sides are aligned with the two bolt insertion holes 67f of the first support frame 67. The nut is provided on the vehicle body right side of the side surface portion 67b on the vehicle body left side of the first support frame 67.

The rubber bush 122 is attached to the first support frame 67 as a fastening bolt B4 is screwed with a nut provided on the vehicle body right side of the bush receiving portion 67c in a state where one end surface in the axial direction of the rubber bush 122 abuts on the bush receiving portion 67c and the other end surface in the axial direction of the rubber bush 122 abuts on the attachment plate 126. The nut is provided on the vehicle body right side of the bush receiving portion 67c. The first mount bracket 100 is supported by the vehicle body frame 6 with the rubber bush 122 attached to the first support frame 67.

The related component connection portion 130 is provided on the center side in the vehicle width direction of the front surface portion 101 of the first mount bracket 100. As illustrated in FIG. 12, the related component connection portion 130 includes a cylindrical portion 131 whose axial center extends in the vehicle body front-rear direction on the center side in the vehicle width direction of the front surface portion 101, and a bearing 132 that is fitted into the cylindrical portion 131 and rotatably supports the front wheel propeller shaft 11.

The bearing 132 includes an outer ring 133 having a substantially cylindrical shape fitted and attached in the cylindrical portion 131, an inner ring 134 fitted to an outer periphery of the front wheel propeller shaft 11 and concentric with the outer ring 133, and a plurality of balls 135 interposed between the outer ring 133 and the inner ring 134, and the outer ring 133 and the inner ring 134 are configured to be relatively rotatable.

As illustrated in FIG. 1, the front wheel propeller shaft 11 is divided into a first divided shaft 11a arranged on the vehicle body rear side, a second divided shaft 11b arranged on the vehicle body front side of the first divided shaft 11a, and a third divided shaft 11c arranged on the vehicle body front side of the second divided shaft 11b. The front wheel propeller shaft 11 includes a rotating portion that rotates by power from the engine 21, and the first divided shaft 11a, the second divided shaft 11b, and the third divided shaft 11c as the rotating portions rotate by power from the engine 21.

The first divided shaft 11a and the second divided shaft 11b are connected via a first universal joint 11d, and the second divided shaft 11b and the third divided shaft 11c are connected via a second universal joint 11e. As the first universal joint 11d and the second universal joint lie, a cruciform shaft joint that is configured such that rotation axes of two members can be bent and rotation can be transmitted is used.

A bevel gear to which power from the engine 21 is transmitted from the front wheel output shaft 33 is attached to a rear end portion of the first divided shaft 11a of the front wheel propeller shaft 11, and the first universal joint 11d is attached to a front end portion of the first divided shaft 11a. The first divided shaft 11a is arranged below the engine 21, and is arranged at a position overlapping the engine 21 in the front-rear direction and the vehicle width direction in plan view and at a position overlapping the engine 21 in the vehicle body vertical direction in side view.

The first divided shaft 11a is inserted into the cylindrical portion 131 provided in the front surface portion 101 of the first mount bracket 100 and inserted into the bearing 132 to be attached to the first mount bracket 100. The first divided shaft 11a is supported by the first mount bracket 100 via the bearing 132.

In this manner, the first mount bracket 100 is rigidly connected to the engine 21 at the drive source connection portion 110 and is elastically connected to the vehicle body frame 6 at the frame connection portion 120. The drive source connection portion 110 and the engine 21 are coupled in an abutting state, and the frame connection portion 120 and the vehicle body frame 6 are coupled via the rubber bush 122 which is an elastic member. The first mount bracket 100 is coupled to the front wheel propeller shaft 11 via the bearing 132 at the related component connection portion 130.

The front drive source connection portion 111, which is the drive source connection portion 110, is formed at one end portion in the axial direction of the output shaft 22 of the engine 21 in the first mount bracket 100. The frame connection portion 120 is formed at the other end portion in the axial direction of the output shaft 22 of the engine 21 in the first mount bracket 100. The related component connection portion 130 is formed at an intermediate portion between the drive source connection portion 110 and the frame connection portion 120 in the axial direction of the engine 21.

In the first mount bracket 100, the drive source connection portion 110 is formed in an upper portion of the first mount bracket 100, the frame connection portion 120 is formed in a lower portion of the first mount bracket 100, and the related component connection portion 130 is at least partially formed between the drive source connection portion 110 and the frame connection portion 120 in the vertical direction. As the drive source connection portion 110, the front drive source connection portion 111 and the rear drive source connection portion 116 are included. However, the configuration may be such that one of the front drive source connection portion 111 and the rear drive source connection portion 116 is included.

Figure 14:
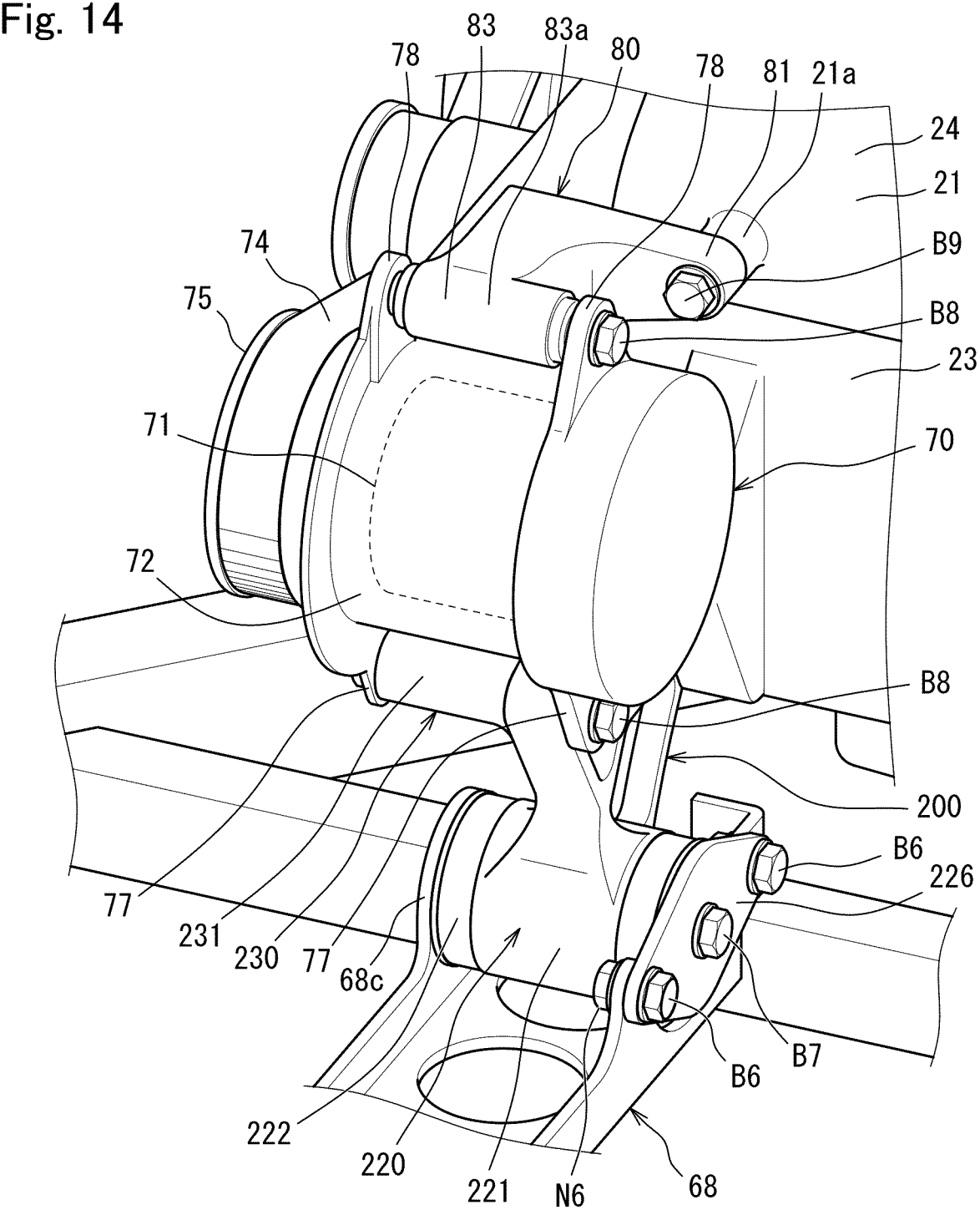
FIG. 14 is a perspective view illustrating the vicinity of a second mount bracket.
Figure 15:
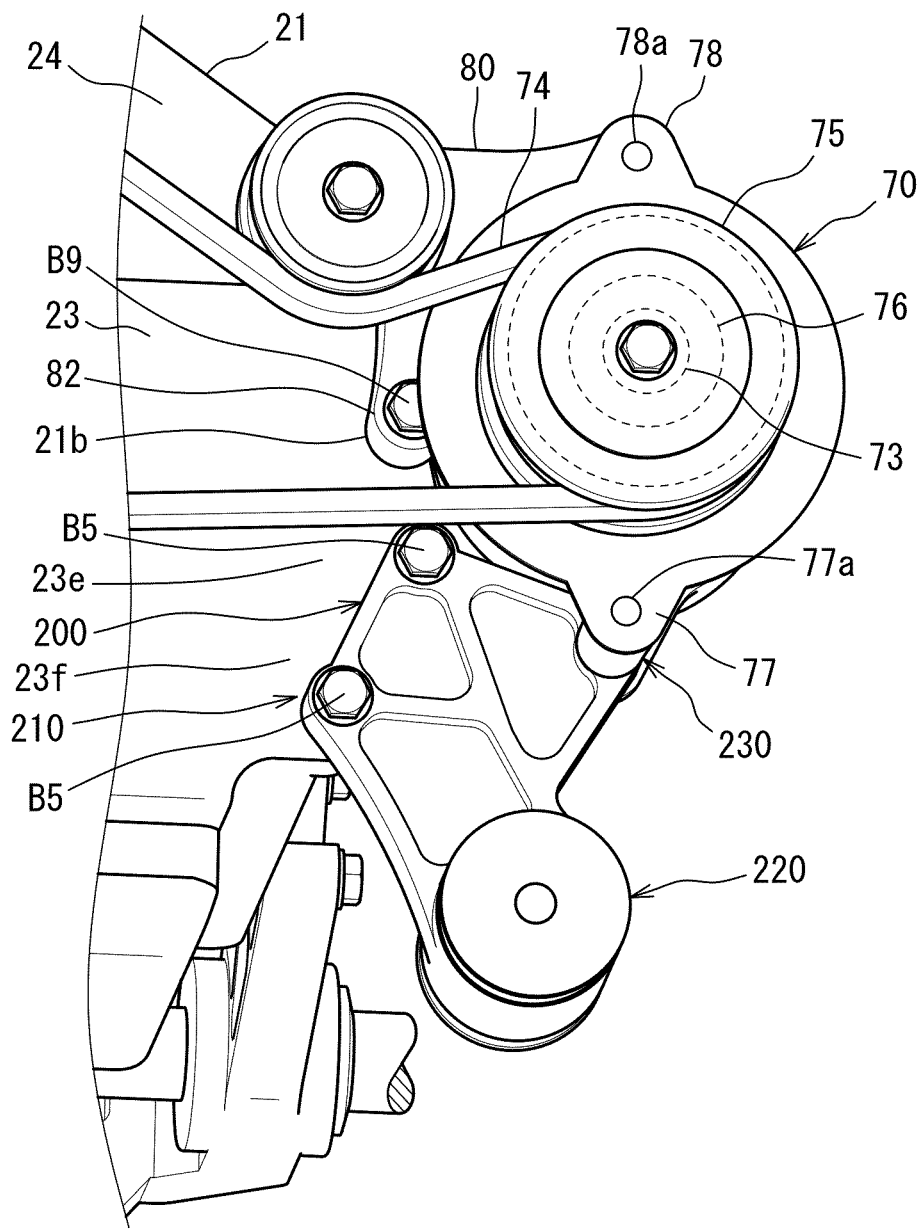
FIG. 15 is a perspective view illustrating the vicinity of the second mount bracket excluding the vehicle body frame.
Figure 16:
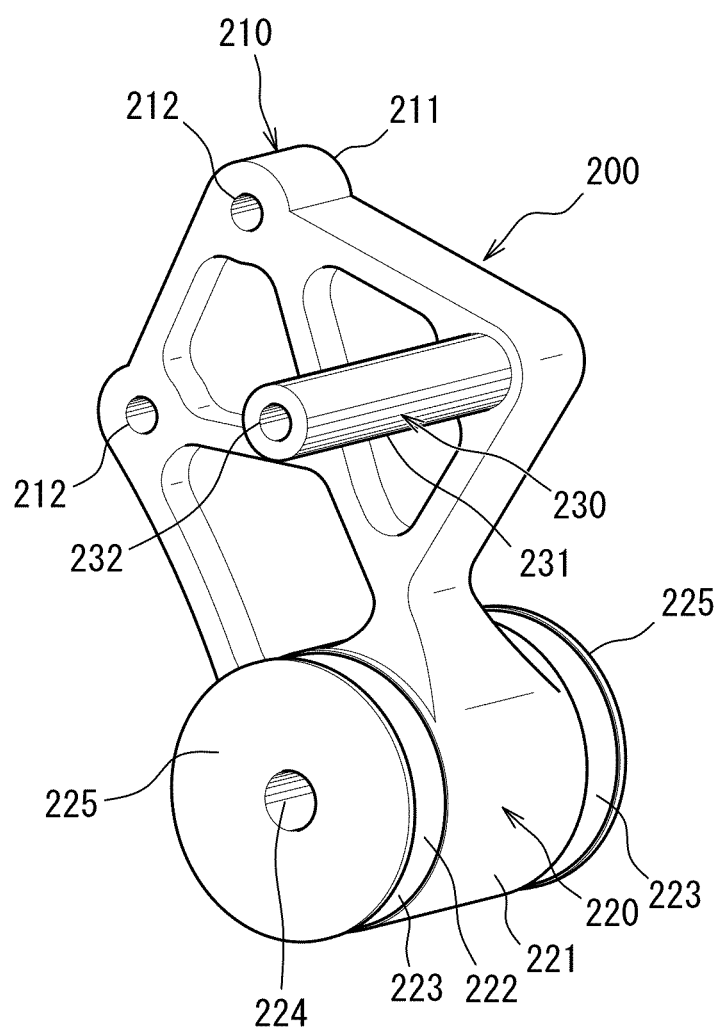
FIG. 16 is a perspective view illustrating the second mount bracket.

FIG. 14 is a perspective view illustrating the vicinity of the second mount bracket, FIG. 15 is a perspective view illustrating the vicinity of the second mount bracket excluding the vehicle body frame, and FIG. 16 is a perspective view illustrating the second mount bracket. As illustrated in FIGS. 14 to 16, the second mount bracket 200 extends in a substantially flat plate shape in a direction substantially orthogonal to the vehicle width direction and is formed in a substantially trapezoidal shape in side view.

As illustrated in FIG. 15, the second mount bracket 200 includes a drive source connection portion 210 connected to the engine 21, a frame connection portion 220 connected to the vehicle body frame 6, and a related component connection portion 230 connected to an air conditioner compressor 70 as a related component related to the engine 21.

The drive source connection portion 210 is provided on the vehicle body rear side and the vehicle upper side of the second mount bracket 200. The drive source connection portion 210 includes an attachment surface portion 211 formed on the vehicle body rear side and the vehicle upper side of the second mount bracket 200, and two bolt insertion holes 212 extending through the attachment surface portion 211 in the vehicle width direction. The two bolt insertion holes 212 are arranged to be offset in the vertical direction and the vehicle body front-rear direction.

In a side surface portion 23e on the vehicle body right side of the crankcase 23, an attachment surface portion 23f extending in a direction substantially orthogonal to the vehicle width direction is formed corresponding to the two bolt insertion holes 212 of the drive source connection portion 210, and two screw holes are formed in the attachment surface portion 23f. The drive source connection portion 210 is attached to the crankcase 23 as the attachment surface portion 211 of the drive source connection portion 210 is placed on the attachment surface portion 23f of the crankcase 23 and a fastening bolt B5 is screwed into the screw hole through the bolt insertion hole 212.

The frame connection portion 220 is provided on the vehicle body lower side of the second mount bracket 200. As illustrated in FIG. 16, the frame connection portion 220 includes a cylindrical portion 221 whose axial center extends in the vehicle width direction on the vehicle body lower side of the second mount bracket 200, and a rubber bush 222 which is fitted in the cylindrical portion 221 and is formed in a substantially cylindrical shape. The rubber bush 222 of the second mount bracket 200 is arranged further on the vehicle body right side and the vehicle body front side than the rubber bush 122 of the first mount bracket 100.

The rubber bush 222 is formed in the same manner as the rubber bush 122. The rubber bush 222 is attached in a manner of being fitted into the cylindrical portion 221 with flange portions 223 on both sides sandwiching the cylindrical portion 221. In the rubber bush 222, a sleeve 224 is joined to the inner side of the rubber bush 222, and end surface plates 225 are joined to both end surfaces in the axial direction of the rubber bush 222.

As illustrated in FIG. 4, the second support frame 68 is formed substantially in the same manner as the first support frame 67. The second support frame 68 includes a bottom surface portion 68a and side surface portions 68b on both sides, and is formed in a substantially U shape when viewed from the vehicle body front-rear direction. A bush receiving portion 68c is formed on the side surface portion 68b on the vehicle body right side, and a bolt insertion hole 68d is formed in a bush receiving portion 68c. A bush accommodating portion 68e and two bolt insertion holes 68f are formed in the side surface portion 68b on the vehicle body left side. As illustrated in FIG. 14, an attachment plate 226 is attached to the second support frame 68 with a fastening bolt B6 and a nut N6.

The rubber bush 222 is attached to the second support frame 68 as a fastening bolt B7 is screwed with a nut in a state where one end surface in the axial direction of the rubber bush 222 abuts on the bush receiving portion 68c and the other end surface in the axial direction of the rubber bush 222 abuts on the attachment plate 226. The nut is provided on the vehicle body right side of the bush receiving portion 68c. The second mount bracket 200 is supported by the vehicle body frame 6 with the rubber bush 222 attached to the second support frame 68.

The related component connection portion 230 is provided on the vehicle front side and the vehicle upper side of the second mount bracket 200. The related component connection portion 230 includes an attachment boss portion 231 extending in the vehicle width direction on the vehicle front side and the vehicle upper side of the second mount bracket 200, and a bolt insertion hole 232 penetrating and extending in the vehicle width direction is formed in the attachment boss portion 231.

The air conditioner compressor 70 as a related component is connected to the engine 21 and arranged on the vehicle body front side and the vehicle body right side of the engine 21. The compressor 70 is arranged at a position overlapping the engine 21 in the vehicle width direction. The compressor 70 is arranged on the vehicle body right side of the engine 21, and the converter 35 is arranged on the vehicle body left side of the engine 21. The compressor 70 is arranged on the opposite side in the axial direction of the output shaft 22 of the engine 21 to the converter 35 with the engine 21 interposed between them.

As illustrated in FIGS. 14 and 15, the compressor 70 includes a compressor case 72 having a substantially cylindrical shape that accommodates a compressor main body portion 71 for compressing a refrigerant, a compressor shaft 73 extending from the inside of the compressor case 72 to the vehicle body right side, an air conditioner pulley 75 to which power from the engine 21 is transmitted from the crankshaft 22 via a belt 74, and a magnet clutch 76 that connects and disconnects power transmission between the compressor shaft 73 and the air conditioner pulley 75.

The air conditioner pulley 75 is attached to the compressor shaft 73 via the magnet clutch 76. The compressor 70 includes the compressor shaft 73 as a rotating portion that rotates by power from the engine 21, and rotates by power from the engine 21.

The compressor 70 includes a lower attachment portion 77 that protrudes radially outward from the lower side of the compressor case 72 and is for attachment to the second mount bracket 200. The compressor 70 includes two of the lower attachment portions 77 provided apart from each other in the axial direction of the compressor case 72. A bolt insertion hole extending in the vehicle width direction is formed in the lower attachment portion 77 on the vehicle body left side, and a screw hole 77a extending in the vehicle width direction is formed in the lower attachment portion 77 on the vehicle body right side.

The compressor 70 includes an upper attachment portion 78 that protrudes radially outward from the upper side of the compressor case 72 and is for attachment to the engine 21. The compressor 70 includes two of the upper attachment portions 78 provided apart from each other in the axial direction of the compressor case 72. A bolt insertion hole extending in the vehicle width direction is formed in the lower attachment portions 77 on the vehicle body left side, and a screw hole 78a extending in the vehicle width direction is formed in the lower attachment portions 77 on the vehicle body right side. The upper attachment portion 78 is attached to the engine 21 via an upper attachment bracket 80 different from the second mount bracket 200.

The compressor 70 is attached to and supported by the second mount bracket 200 as a fastening bolt B8 is screwed from the vehicle body left side into the screw hole 77a of the lower attachment portion 77 through the bolt insertion hole of the lower attachment portion 77 and the bolt insertion hole 232 of the attachment boss portion 231 in a state where the attachment boss portion 231 of the second mount bracket 200 is arranged between two of the lower attachment portions 77 of the compressor 70.

The compressor 70 is also attached to the engine 21 also by the upper attachment bracket 80. The upper attachment bracket 80 includes a first attachment portion 81 attached to the vehicle body front side of the cylinder block 24 and a second attachment portion 82 attached to the vehicle body right side of the crankcase 23, and the first attachment portion 81 is provided further on the vehicle body upper side and the vehicle body front side than the second attachment portion 82. A bolt insertion hole is formed in each of the first attachment portion 81 and the second attachment portion 82.

The engine 21 is provided with attachment portions 21a and 21b on the vehicle body front side and the vehicle body right side of the engine 21 corresponding to the upper attachment bracket 80, and a screw hole is formed in each of the attachment portions 21a and 21b. The first attachment portion 81 and the second attachment portion 82 of the upper attachment bracket 80 are attached to the attachment portions 21a and 21b of the engine 21 as the fastening bolts B8 is screwed into the screw hole through the bolt insertion hole.

The upper attachment bracket 80 includes a third attachment portion 83 mounted to the compressor 70, and the third attachment portion 83 is provided further on the vehicle body front side than the first attachment portion 81 and the second attachment portion 82. The third attachment portion 83 includes a cylindrical portion 83a extending in a substantially cylindrical shape in the vehicle width direction, and a bolt insertion hole is formed in the cylindrical portion 83a.

The compressor 70 is attached to the upper attachment bracket 80 as the fastening bolt B8 is screwed from the vehicle body left side into the screw hole 78a of the upper attachment portion 78 through the bolt insertion hole of the upper attachment portion 78 and the bolt insertion hole of the third attachment portion 83 in a state where the third attachment portion 83 of the upper attachment bracket 80 is arranged between two of the upper attachment portions 78 of the compressor 70. The compressor 70 may be directly attached to the engine 21 without using the upper attachment bracket 80. The compressor 70 may be attached only to the second mount bracket 200 without using the upper attachment bracket 80.

In this manner, the second mount bracket 200 is rigidly connected to the engine 21 at the drive source connection portion 210 and is elastically connected to the vehicle body frame 6 at the frame connection portion 220. The drive source connection portion 210 and the engine 21 are coupled in an abutting state, and the frame connection portion 220 and the vehicle body frame 6 are coupled via the rubber bush 222 which is an elastic member. The second mount bracket 200 is rigidly connected to the compressor 70 at the related component connection portion 230. The related component connection portion 230 and the compressor 70 are coupled in an abutting state.

In the second mount bracket 200, the drive source connection portion 210 is formed in an upper portion of the second mount bracket 200, the frame connection portion 220 is formed in a lower portion of the second mount bracket 200, and the related component connection portion 230 is at least partially formed between the drive source connection portion 210 and the frame connection portion 220 in the vertical direction.

In the second mount bracket 200, the drive source connection portion 210 is formed at a rear portion of the second mount bracket 200, and the frame connection portion 220 and the related component connection portion 230 are formed at a front portion of the second mount bracket 200. The configuration may be such that at least a part of the related component connection portion 230 is formed in an intermediate portion between the drive source connection portion 210 and the frame connection portion 220 in the vehicle body front-rear direction.

Figure 17:
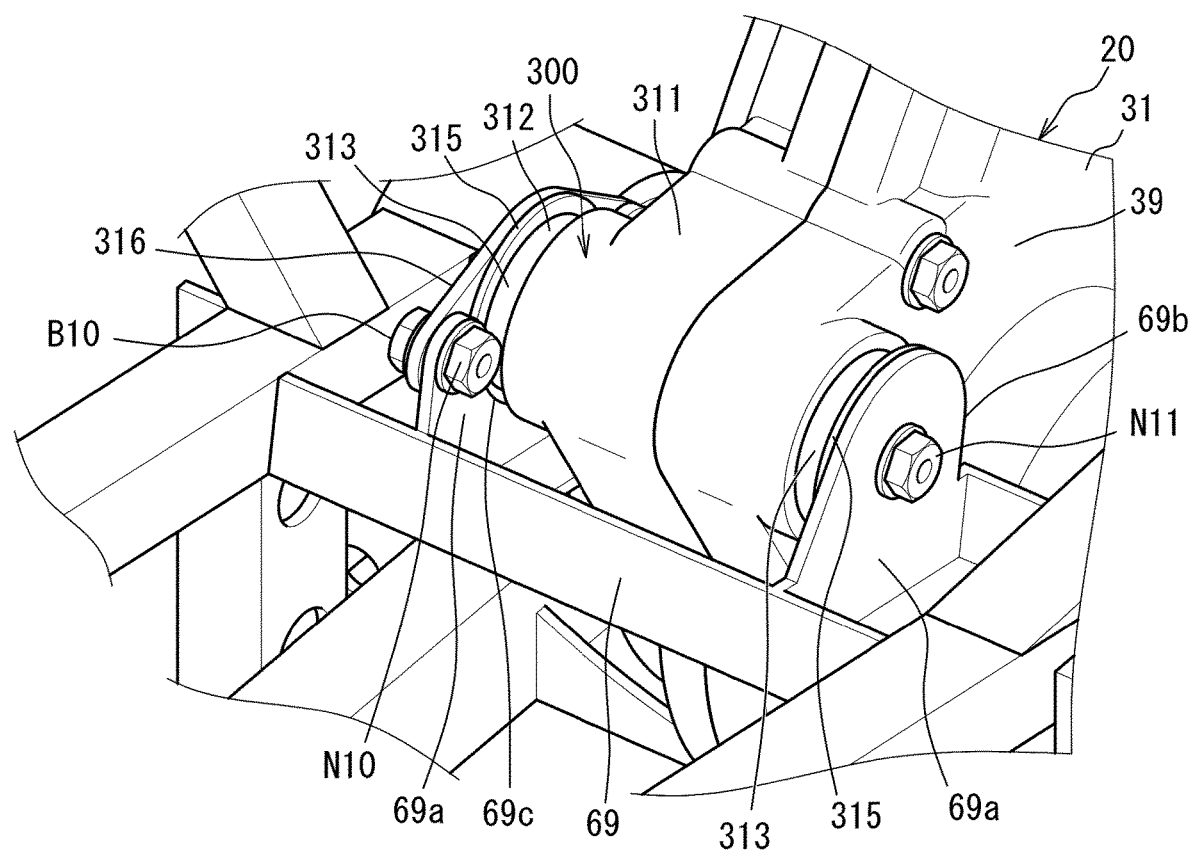
FIG. 17 is a perspective view illustrating the vicinity of a rear mount.

FIG. 17 is a perspective view illustrating the vicinity of the rear mount. As illustrated in FIG. 17, the rear mount 300 is provided integrally with a transmission case 39 on the vehicle body rear side of the transmission 31. The rear mount 300 is formed separately from the transmission case, and can be attached to the transmission case.

The rear mount 300 includes a cylindrical portion 311 having an axial center extending in the vehicle width direction, and a rubber bush 312 fitted into the cylindrical portion 311 and formed in a substantially cylindrical shape. In the rubber bush 312, flange portions 313 on both sides are fitted and attached in the cylindrical portion 311 so as to sandwich the cylindrical portion 311, a sleeve is joined to the inner side of the rubber bush 312, and an end surface plate 315 is joined to both end surfaces in the axial direction of the rubber bush 312.

The third support frame 69 is integrally attached to two support plates 69a spaced apart from each other in the vehicle width direction and extending upward. As illustrated in FIG. 4, a bush receiving portion 69c is formed in the support plate 69a on the vehicle body right side, and a bolt insertion hole 69d is formed in the bush receiving portion 69c. A bush accommodating portion 69e and two bolt insertion holes 69f are formed in the support plate 69a on the vehicle body left side. As illustrated in FIG. 17, an attachment plate 316 is formed in a flat plate shape, and is attached to the support plate 69a on the vehicle body left side using a fastening bolt B10 and a nut N10.

The rubber bush 312 is attached to the second support frame 68 using a fastening bolt and a nut N11 in a state where one end surface in the axial direction of the rubber bush 312 abuts on a bush receiving portion 69b and the other end surface in the axial direction of the rubber bush 312 abuts on the attachment plate 316. The rear mount 300 is supported by the vehicle body frame 6 as the rubber bush 312 is attached to the third support frame 69.

In this manner, the engine 21 is elastically connected to the vehicle body frame 6 by the first mount bracket 100, the second mount bracket 200, and the rear mount 300 in a state of being connected to the transmission 31. The first mount bracket 100 and the second mount bracket 200 support the front wheel propeller shaft 11 and the air conditioner compressor 70 as related components connected to the engine 21, respectively.

The first mount bracket 100 and the second mount bracket 200 are rigidly connected to the engine 21 and are elastically connected to the vehicle body frame 6. The front wheel propeller shaft 11 is rotatably supported by the first mount bracket 100 via the bearing 132. As described above, the front wheel propeller shaft 11 is arranged below the crankcase 23, and at least a part of the front wheel propeller shaft 11 is located further to the upper side than a lower end portion of the crankcase 23 attached to the oil pan 27.

In the present embodiment, the front wheel propeller shaft 11 and the air conditioner compressor 70 are supported by the first mount bracket 100 and the second mount bracket 200, but the front wheel propeller shaft 11 may be supported by the first mount bracket 100 while the air conditioner compressor is not supported by the second mount bracket 200, or the air conditioner compressor 70 may be supported by the second mount bracket 200 while the front wheel propeller shaft is not supported by the first mount bracket 100.

Figure 18:
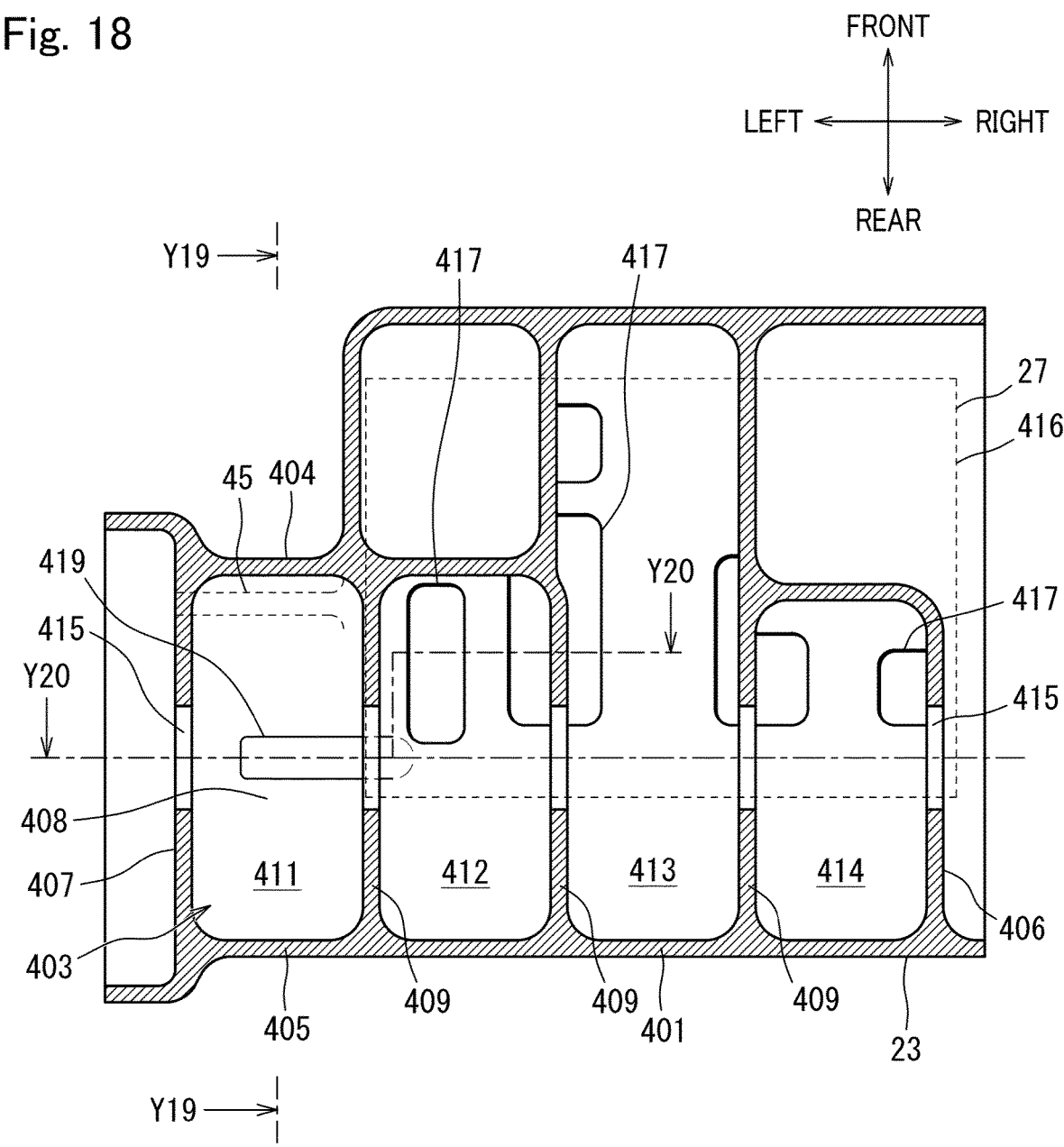
FIG. 18 is a top view of a crankcase and an oil pan.
Figure 19:
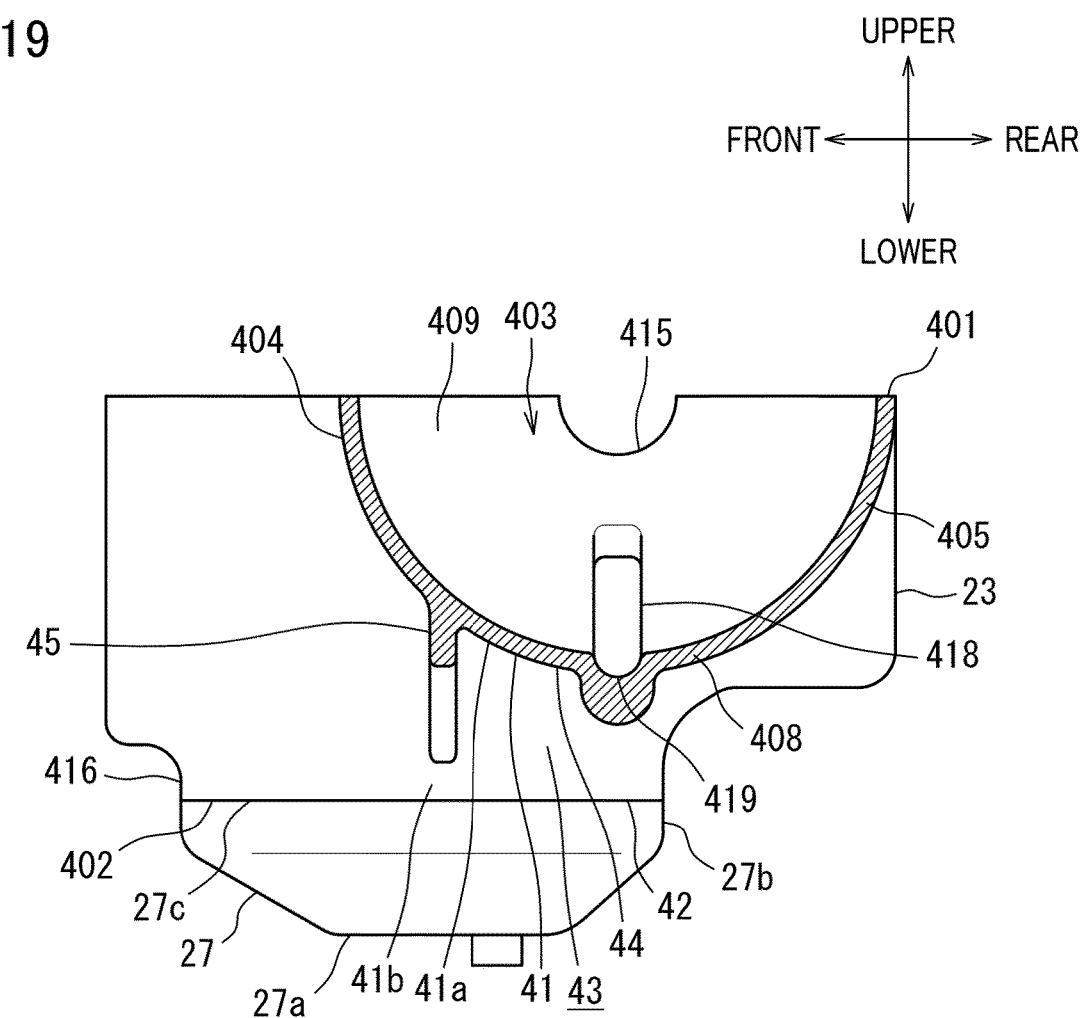
FIG. 19 is a cross-sectional view of the crankcase and the oil pan taken along line Y19-Y19 in FIG. 18.
Figure 20:
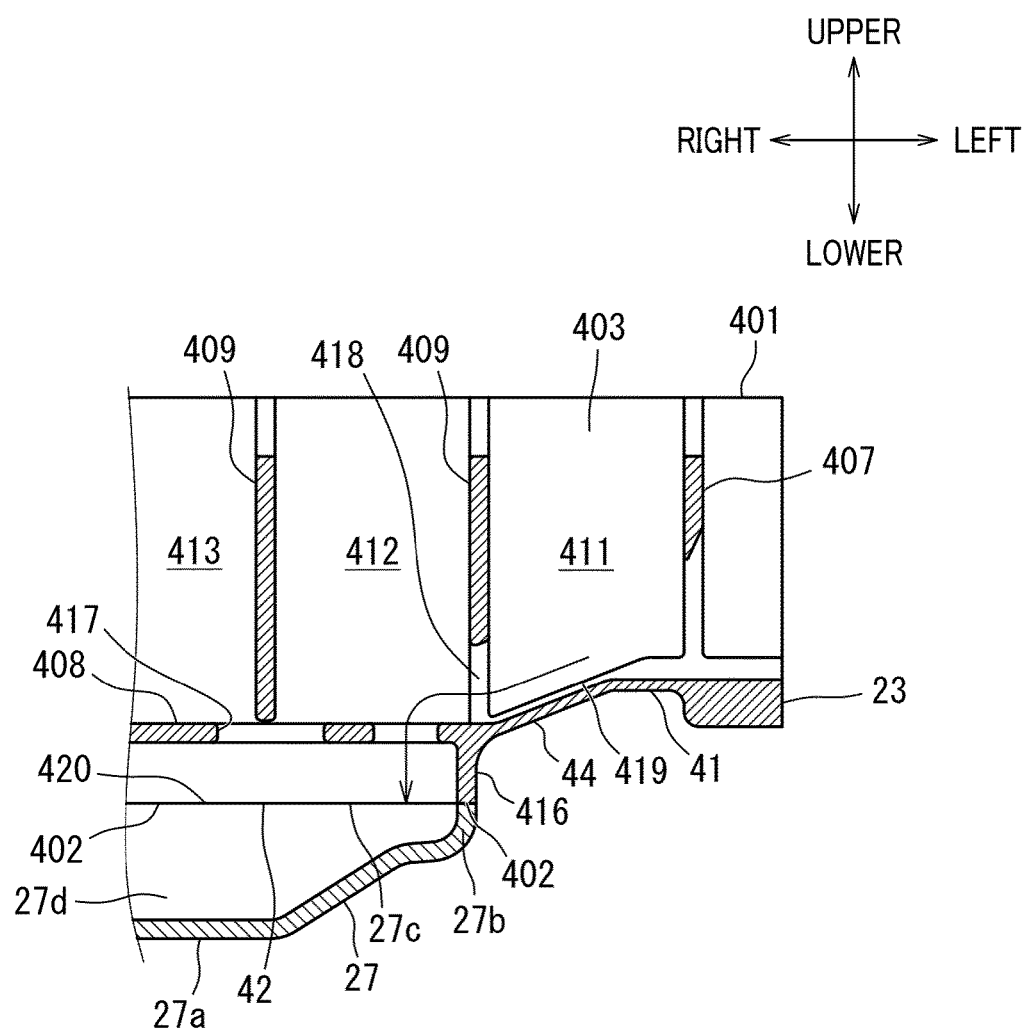
FIG. 20 is a cross-sectional view of the crankcase and the oil pan taken along line Y20-Y20 in FIG. 18.

FIG. 18 is a top view of the crankcase and the oil pan, FIG. 19 is a cross-sectional view of the crankcase and the oil pan taken along line Y19-Y19 in FIG. 18, and FIG. 20 is a cross-sectional view of the crankcase and the oil pan taken along line Y20-Y20 in FIG. 18. As illustrated in FIGS. 18 to 20, an upper mating surface 401 attached to the cylinder block 24 is provided on an upper end surface of the crankcase 23, and a lower mating surface 402 attached to the oil pan 27 is provided on a lower end surface of the crankcase 23.

The crankcase 23 has a crank chamber 403 that is recessed downward from the upper mating surface 401 and accommodates the crankshaft 22 extending in the vehicle width direction. The crank chamber 403 is formed to open to the vehicle body upper side by a front wall portion 404 arranged on the vehicle body front side, a rear wall portion 405 arranged on the vehicle body rear side, a right wall portion 406 arranged on the vehicle body right side, a left wall portion 407 arranged on the vehicle body left side, and a bottom portion 408 arranged on the vehicle body lower side. The crank chamber 403 is partitioned into four crank chambers, specifically, first, second, third, and fourth crank chambers 411, 412, 413, and 414 from the vehicle body left side by three partition wall portions 409 formed between the right wall portion 406 and the left wall portion 407.

Each of the first, second, third, and fourth crank chambers 411, 412, 413, and 414 accommodates a crank pin of the crankshaft 22 connected to a piston arranged in the cylinder 15 via a connecting rod, a crank arm connected to the crank pin, and a counter weight provided in the crank arm.

In the crankcase 23, a bearing surface portion 415 recessed downward in a semicircular cross section is formed on each of upper end surfaces of the right wall portion 406, the left wall portion 407, and three of the partition wall portions 409, and the bearing surface portion 415 supports a crank journal of the crankshaft 22. In the crankcase 23, a portion constituting the third crank chamber 413 in the front wall portion 404 is provided further on the vehicle body front side than a portion constituting the first, second, and fourth crank chambers 411, 412, and 414.

The crankcase 23 is integrally provided with an oil pan attachment portion 416 protruding further to the lower side than the bottom portion 408 constituting the crank chamber 403. The oil pan attachment portion 416 is formed in a substantially square cylindrical shape, and a lower end surface of the oil pan attachment portion 416 is the lower mating surface 402 attached to the oil pan 27. The oil pan attachment portion 416 is provided below the second, third, and fourth crank chambers 412, 413, and 414 provided further on the vehicle body right side than the first crank chamber 411.

The oil pan 27 has a bottom portion 27a formed in a substantially rectangular shape in plan view and a side wall portion 27b extending upward from the bottom portion 27a, and the bottom portion 27a is formed to bulge downward. In the oil pan 27, a mating surface 27c with the crankcase 23 is provided on an upper end surface of the side wall portion 27b, and an oil storage chamber 27d for storing oil as lubricating liquid is formed by the bottom portion 27a and the side wall portion 27b. The oil pan 27 is arranged below the second, third, and fourth crank chambers 412, 413, and 414 provided further on the vehicle body right side than the first crank chamber 411.

In the bottom portion 408 of the crankcase 23 constituting the second, third, and fourth crank chambers 412, 413, and 414, a discharge hole 417 for discharging oil to an opening 420 opened downward of the crankcase 23 is formed. Oil stored in the oil pan 27 is sucked up by an oil pump, supplied to the crank journal or the like of the crankshaft 22, flows to the bottom portion 408 of the first, second, third, and fourth crank chambers 411, 412, 413, and 414, and is returned from the opening 420 to the oil pan 27 through the discharge hole 417.

As illustrated in FIG. 19, a communication hole 418 for communication of the first crank chamber 411 and the second crank chamber 412 is provided on the lower side of the partition wall portion 409 dividing the first crank chamber 411 and the second crank chamber 412. The communication hole 418 provided on the lower side of the partition wall portion 409 is provided over the bottom portion 408 connecting the vehicle body rear side of the front wall portion 404 and the vehicle front side of the rear wall portion 405.

As illustrated in FIGS. 18 to 20, the bottom portion 408 of the first crank chamber 411 and the second crank chamber 412 is provided with a passage 419 for guiding oil guided to the first crank chamber 411 to the discharge hole 417 and the opening 420 formed in the bottom portion 408 of the second crank chamber 412 corresponding to the communication hole 418 provided on the lower side of the partition wall portion 409. The passage 419 is recessed downward in a groove shape in a substantially semicircular cross section in the bottom portion 408. As illustrated in FIG. 18, the passage 419 extends in the vehicle width direction in the axial direction of the crankshaft 22 from the first crank chamber 411 to the second crank chamber 412. As illustrated in FIG. 20, the passage 419 is inclined downward from the vehicle body left side toward the vehicle body right side.

In this manner, oil supplied to the crank journal or the like of the crankshaft 22 and flowing to the bottom portion 408 of the first crank chamber 411 flows from the first crank chamber 411 to the second crank chamber 412 through the passage 419 and returns to the oil pan 27 through the discharge hole 417 and the opening 420.

In the utility vehicle 1, as illustrated in FIG. 9, a lower portion of the crankcase 23 in the axial direction of the crankshaft 22 has the recessed portion 41 recessed upward as viewed in the vehicle body front-rear direction and the remaining portion 42 excluding the recessed portion 41. At least a part of the front wheel propeller shaft 11 is arranged in the space 43 defined below the recessed portion 41 and positioned further to the upper side than a lower end portion of the crankcase 23.

The crankcase 23 is provided with the oil pan attachment portion 416 in the remaining portion 42. The crankcase 23 has the opening 420 that opens downward of the crankcase 23 in the remaining portion 42, and a bottom portion 44 that closes the lower side of the crankcase 23 in the recessed portion 41. The oil pan 27 is attached to a lower surface of the remaining portion 42. The bottom portion 44 provided in the recessed portion 41 is constituted by the bottom portion 408 constituting the first crank chamber 411. As described above, in the crankcase 23, the passage 419 that guides oil guided to the bottom portion 44 provided in the recessed portion 41 to the discharge hole 417 provided in the bottom portion 408 of the crankcase 23 and the opening 420 of the remaining portion 42 is formed.

The recessed portion 41 is formed at a position corresponding to one of four of the cylinders 15, that is, the cylinder 15 on the vehicle body left side, and the remaining portion 42 is formed at a position corresponding to the remaining ones of four of the cylinders 15, that is, three of the cylinders 15 on the vehicle body right side.

As illustrated in FIG. 19, in the crankcase 23, in a lower surface 41a of the recessed portion 41, a rib portion 45 that connects the lower surface 41a of the recessed portion 41 and a side surface 41b on the remaining portion side of the recessed portion 41 is formed. As illustrated in FIG. 18, the rib portion 45 linearly extends in parallel with the axial direction of the crankshaft 22 with a predetermined width substantially at the center in the vehicle body front-rear direction of the crankcase 23. The crankcase 23 is reinforced by the rib portion 45.

Although the engine 21 and the transmission 31 are formed separately, and the engine 21 and the transmission 31 are connected by the connecting bracket 30 to constitute the power unit 20, a power unit in which the engine and the transmission are integrally formed can also be used.

As described above, the utility vehicle 1 according to the present embodiment includes the vehicle body frame 6, the traveling drive source 21, the mount brackets 100 and 200 for mounting the traveling drive source 21 on the vehicle body frame 6, and the related components 11 and 70 connected to the traveling drive source 21, and the related components 11 and 70 are supported by the mount brackets 100 and 200.

By the above, since the related components 11 and 70 are supported by the mount brackets 100 and 200 for mounting the traveling drive source 21 on the vehicle body frame 6, the number of components can be reduced and a compact configuration can be achieved as compared with a case where the related components 11 and 70 are connected to the traveling drive source 21 using a bracket different from the mount brackets 100 and 200.

Further, the related components 11 and 70 include the rotating portions 11 and 73 that are rotated by power from the traveling drive source 21. By the above, the related components 11 and 70 including the rotating portions 11 and 73 rotated by power from the traveling drive source 21 are supported by the mount brackets 100 and 200 for mounting the traveling drive source 21 on the vehicle body frame 6, and thus, it is possible to effectively perform power transmission from the traveling drive source 21 to the related components 11 and 70 by shortening a power transmission path for transmitting power from the traveling drive source 21 to the related components 11 and 70.

Further, the mount bracket 100 is rigidly connected to the traveling drive source 21 and is elastically connected to the vehicle body frame 6, and the related component 11 is supported by the mount bracket 100 via the bearing 132. By the above, it is possible to suppress transmission of vibration from the traveling drive source 21 to the vehicle body frame 6 by the mount bracket 100, and it is possible to effectively transmit power from the traveling drive source 21 to the related component 11 by suppressing displacement of the related component 11 with respect to the traveling drive source 21.

Further, the mount bracket 200 is rigidly connected to the traveling drive source 21 and the related components 70, and is elastically connected to the vehicle body frame 6. By the above, it is possible to suppress transmission of vibration from the traveling drive source 21 to the vehicle body frame 6 by the mount bracket 200 and to suppress displacement of the related component 70 with respect to the traveling drive source 21.

Further, the mount bracket 100 includes the drive source connection portion 111 formed at one end portion in the axial direction of the output shaft 22 of the traveling drive source 21 in the mount bracket 100 and connected to the traveling drive source 21, the frame connection portion 120 formed at the other end portion in the axial direction of the output shaft 22 of the traveling drive source 21 in the mount bracket 100 and connected to the vehicle body frame 6, and the related component connection portion 130 formed between the drive source connection portion 111 and the frame connection portion 120 and connected to the related component 11. By the above, in the mount bracket 100, since the related component connection portion 130 is formed between the drive source connection portion 111 formed at one end portion and the frame connection portion 120 formed at the other end portion, the related component connection portion 130 is provided at an intermediate portion connecting the drive source connection portion 111 and the frame connection portion 120 of the mount bracket 100 to suppress increase in size of the mount bracket 100, and the vehicle body frame 6 can compactly support the traveling drive source 21 and the related component 11.

Further, the mount bracket 100 includes the drive source connection portion 110 formed in an upper portion of the mount bracket 100 and connected to the traveling drive source 21, the frame connection portion 120 formed in a lower portion of the mount bracket 100 and connected to the vehicle body frame 6, and the related component connection portion 130 at least partially formed between the drive source connection portion 110 and the frame connection portion 120 in the vertical direction and connected to the related component 11. By the above, in the mount bracket 100, since at least a part of the related component connection portion 130 is formed between the drive source connection portion 110 formed at the upper portion and the frame connection portion 120 formed at the lower portion in the vertical direction, the related component connection portion 130 is provided at an intermediate portion connecting the drive source connection portion 110 and the frame connection portion 120 of the mount bracket 100 to suppress increase in size of the mount bracket 100, and the vehicle body frame 6 can compactly support the traveling drive source 21 and the related component 11.

Further, the mount bracket 200 includes the drive source connection portion 210 formed at a rear portion of the mount bracket 200 and connected to the traveling drive source 21, the frame connection portion 220 formed at a front portion of the mount bracket 200 and connected to the vehicle body frame 6, and the related component connection portion 230 at least partially formed between the drive source connection portion 210 and the frame connection portion 220 in the vehicle body front-rear direction and connected to the related component 70. By the above, in the mount bracket 200, at least a part of the related component connection portion 230 is formed between the drive source connection portion 210 formed at the rear portion and the frame connection portion 220 formed at the front portion in the vehicle body front-rear direction. Therefore, the related component connection portion 230 is provided in an intermediate portion connecting the drive source connection portion 210 and the frame connection portion 220 of the mount bracket 200 to suppress increase in size of the mount bracket 200, and the vehicle body frame 6 can compactly support the traveling drive source 21 and the related component 70.

Further, the related component 11 is arranged adjacent to the traveling drive source 21 in a direction orthogonal to the axial direction of the output shaft 22 of the traveling drive source 21, and is arranged to overlap the traveling drive source 21 at an axial direction position. By the above, the related component 11 arranged adjacent to the traveling drive source 21 in a direction orthogonal to the axial direction of the output shaft 22 of the traveling drive source 21 is arranged so as to overlap the traveling drive source 21 at the axial direction position. Therefore, an amount of protrusion of the related components 11 and 70 from the traveling drive source 21 in the axial direction can be suppressed, and the traveling drive source 21 and the related component 11 can be compactly arranged.

Further, the power transmission mechanism 35 which is connected to the output shaft 22 of the traveling drive source 21 and to which traveling power from the traveling drive source 21 is transmitted is provided, and the related component 70 is arranged on the opposite side in the axial direction of the output shaft 22 of the traveling drive source 21 to the power transmission mechanism 35 with the traveling drive source 21 interposed between them. By the above, it is possible to suppress interference between the related component 70 and the power transmission mechanism 35 connected to the output shaft 22 of the traveling drive source 21 and to which traveling power is transmitted, and to improve the degree of freedom of the layout of the related component 70 supported by the mount bracket.

Further, the mount bracket 100 is connected to a side portion of the traveling drive source 21 on the output side in the axial direction of the output shaft 22 of the traveling drive source 21. By the above, in a case where power from the traveling drive source 21 is transmitted to the related component 11, a power transmission path for transmitting the power from the traveling drive source 21 to the related component 11 can be shortened and configured compactly.

Further, the mount brackets 100 and 200 are provided on a side portion of the traveling drive source 21 on both sides in the axial direction of the output shaft 22 of the traveling drive source 21, and the related components 11 and 70 are supported by at least one of the mount brackets 100 and 200 provided on side portions on both sides of the traveling drive source 21. By the above, the related components 11 and 70 can be supported using the mount brackets 100 and 200 provided on side portions on both sides in the axial direction of the output shaft 22 of the traveling drive source 21, and the number of components can be reduced.

Further, the related component 11 is the propeller shaft 11 to which power from the traveling drive source 21 is transmitted. By the above, since the propeller shaft 11 is supported by the mount bracket 100, the support rigidity of the propeller shaft 11 can be improved while the number of components is reduced as compared with a case of using a bracket that supports the propeller shaft 11 on the vehicle body frame 6 separately from the mount bracket 100.

Further, the propeller shaft 11 is supported by the mount bracket 100, the mount bracket 100 has the drive source connection portion 111 connected to the traveling drive source 21 and the frame connection portion 120 connected to the vehicle body frame 6 and extends in a direction orthogonal to the axial direction of the propeller shaft 11, the drive source connection portion 111 and the frame connection portion 120 are arranged to be separated from each other in a direction orthogonal to the axial direction of the propeller shaft 11, and the propeller shaft 11 is supported between the drive source connection portion 111 and the frame connection portion 120 of the mount bracket 100 in a direction orthogonal to the axial direction of the propeller shaft 11 via the bearing 132. By the above, the propeller shaft 11 can be supported by the mount bracket 110 in the direction orthogonal to the axial direction of the propeller shaft 11, and the support rigidity of the propeller shaft 11 can be improved.

Further, the traveling drive source 21 has the portion 41 recessed from the outer side to the inner side in a direction orthogonal to the axial direction of the propeller shaft 11, and the propeller shaft 11 is supported by the mount bracket 100 in the recessed portion 41. Accordingly, the traveling drive source 21 and the propeller shaft 11 can be arranged in a compact manner.

Further, the related component 70 is the air conditioner compressor 70 driven by the traveling drive source 21. By the above, since the air conditioner compressor 70 is supported by the mount bracket 200, the air conditioner compressor 70 can be integrated with the mount bracket 200, and the air conditioner compressor 70 can be compactly supported.

The utility vehicle 1 according to the present embodiment also includes the engine 21 having the crankcase 23 that supports the crankshaft 22, and the propeller shaft 11 arranged below the crankcase 23. The crankcase 23 has the recessed portion 41 in which a lower portion of the crankcase 23 is recessed upward and the remaining portion 42 excluding the recessed portion 41 in the axial direction of the crankshaft 22. At least a part of the propeller shaft 11 is arranged in the space 43 defined below the recessed portion 41 and positioned further to the upper side than a lower end portion of the crankcase 23.

By the above, at least a part of the propeller shaft 11 is arranged in the space 43 defined below the recessed portion 41 of the crankcase 23 further on the upper side than a lower end portion of the crankcase 23, and the recessed portion 41 of the crankcase 23 has a lower surface positioned further on the upper side than the remaining portion 42 of the crankcase 23. Accordingly, the propeller shaft 11 and the crankcase 23 can be arranged close to each other while interference between the propeller shaft 11 and the crankcase 23 is prevented. That is, the engine 21 and the propeller shaft 11 can be arranged more compactly than a case where the propeller shaft 11 is arranged on the outer side in the axial direction of the crankcase 23 than the crankcase 23 or a case where the propeller shaft 11 is arranged further on the lower side than a lower end portion of the crankcase 23.

Further, the engine 21 has the oil pan 27 provided in a lower portion of the crankcase 23, the crankcase 23 has the opening 420 opened downward of the crankcase 23 in the remaining portion 42 and the bottom portion 44 closing the lower side of the crankcase 23 in the recessed portion 41, and the oil pan 27 is attached to a lower surface of the remaining portion 42. By the above, since the oil pan 27 is attached to the lower surface of the remaining portion 42 of the crankcase 23 having the opening 420 opened downward of the crankcase 23, it is possible to prevent interference between the oil pan 27 and the propeller shaft 11 arranged in the space 43 defined below the recessed portion 41 of the crankcase 23.

Further, in the crankcase 23, the passage 419 for guiding lubricant guided to the bottom portion 44 of the recessed portion 41 to the opening 420 of the remaining portion 42 is formed. By the above, even in a case where the oil pan is not provided below the recessed portion 41 of the crankcase 23, the lubricant guided to the bottom portion 44 of the recessed portion 41 of the crankcase 23 through the passage 419 can be returned to the oil pan 27.

Further, the engine 21 is the engine 21 in which a plurality of the cylinders 15 are arranged side by side in the vehicle width direction, the recessed portion 41 is formed at a position corresponding to one of a plurality of the cylinders 15, and the remaining portion 42 is formed at a position corresponding to a remaining one of a plurality of the cylinders 15. By the above, since the engine 21 is the engine 21 in which a plurality of the cylinders 15 are arranged side by side in the vehicle width direction, the utility vehicle 1 including a transversal type multiple cylinder engine can be configured compactly in the vehicle width direction and the vertical direction.

Further, the rib portion 45 that connects the lower surface 41a of the recessed portion 41 and the side surface 41b on the remaining portion side of the recessed portion 41 is formed on the lower surface 41a of the recessed portion 41. By the above, the recessed portion 41 of the crankcase 23 can be reinforced by the rib portion 45.

In the present embodiment, the front wheel propeller shaft 11 is arranged at a position corresponding to one of the cylinders 15 arranged on the vehicle body left side of the crankcase 23, but can be arranged at a position corresponding to one of the cylinders 15 arranged on the vehicle body right side of the crankcase 23. Although the engine 21 is used as the traveling drive source, a motor can also be used as the traveling drive source.

The present disclosure is not limited to the illustrated embodiment, and various improvements and design changes can be made without departing from the gist of the present disclosure.

What is claimed is:

1. A utility vehicle comprising: a vehicle body frame; a traveling drive source; a mount bracket for mounting the traveling drive source on the vehicle body frame; and a propeller shaft connected to the traveling drive source, and extending in a vehicle body front-rear direction, the propeller shaft being configured to transmit power from the traveling drive source to a front wheel, wherein at least a portion of the propeller shaft is located at a position overlapping the traveling drive source when viewed from a position above the vehicle body frame, wherein the propeller shaft extends forward from behind the traveling drive source and is supported by the mount bracket at a position forward of the position overlapping the traveling drive source when viewed from the position above the vehicle body frame, and wherein: the mount bracket is rigidly connected to the traveling drive source and is elastically connected to the vehicle body frame, and the propeller shaft is rotatably supported by the mount bracket via a bearing.

2. The utility vehicle according to claim 1, wherein the mount bracket includes:
a drive source connection portion at a first axial end of an output shaft of the traveling drive source in the mount bracket and connected to the traveling drive source,
a frame connection portion at a second axial end of the output shaft of the traveling drive source in the mount bracket and connected to the vehicle body frame, and
a related component connection portion formed between the drive source connection portion and the frame connection portion and connected to the propeller shaft.

3. The utility vehicle according to claim 1, wherein the mount bracket includes:

a drive source connection portion in an upper portion of the mount bracket and connected to the traveling drive source,
a frame connection portion in a lower portion of the mount bracket and connected to the vehicle body frame, and
a related component connection portion at least partially between the drive source connection portion and the frame connection portion in a vertical direction and connected to the propeller shaft.

4. The utility vehicle according to claim 1, wherein the propeller shaft is arranged adjacent to the traveling drive source in a direction orthogonal to an axial direction of an output shaft of the traveling drive source, and the related component is arranged to overlap the traveling drive source at an axial direction position.

5. The utility vehicle according to claim 1, wherein the mount bracket is connected to a side portion of the traveling drive source on an output side in an axial direction of an output shaft of the traveling drive source.

6. The utility vehicle according to claim 1, wherein:
the mount bracket includes a drive source connection portion connected to the traveling drive source and a frame connection portion connected to the vehicle body frame, and the mount body extends in a direction orthogonal to an axial direction of the propeller shaft,
the drive source connection portion and the frame connection portion are arranged apart from each other in a direction orthogonal to the axial direction of the propeller shaft, and
the propeller shaft is supported between the drive source connection portion and the frame connection portion of the mount bracket via a bearing in a direction orthogonal to the axial direction of the propeller shaft.

7. The utility vehicle according to claim 1, wherein:
the traveling drive source has a portion recessed from an outer side to an inner side in a direction orthogonal to an axial direction of the propeller shaft, and
the propeller shaft is supported by the mount bracket in the recessed portion.

8. The utility vehicle according to claim 1, further comprising:
a transmission including an input shaft to which power from the traveling drive source is transmitted, a front wheel output shaft for transmitting power from the traveling drive source to the front wheel, and a rear wheel output shaft for transmitting power from the traveling drive source to a rear wheel,
wherein the propeller shaft is configured to transmit the power transmitted to the input shaft to the front wheel.

9. The utility vehicle according to claim 8, wherein:
the transmission further includes a two-wheel drive four-wheel drive switching device, and
the two-wheel drive four-wheel drive switching device is configured to be switchable between a two wheel drive state in which the input shaft and the rear wheel output shaft are connected and a four wheel drive state in which the input shaft, the front wheel output shaft, and the rear wheel output shaft are connected.

10. A utility vehicle comprising:
an engine having a crankcase supporting a crankshaft;
a propeller shaft arranged below the crankcase, and
a mount bracket for mounting the engine on a vehicle body frame,
wherein the crankcase includes a recessed portion in which a lower portion of the crankcase is recessed upward and a remaining portion excluding the recessed portion in an axial direction of the crankshaft, wherein at least a part of the propeller shaft is arranged in a space defined below the recessed portion, and positioned further on an upper side than a lower end portion of the crankcase, wherein the propeller shaft is supported by the mount bracket, wherein the engine includes a plurality of cylinders arranged side by side in a vehicle width direction, wherein the recessed portion is formed at a position corresponding to one of the plurality of cylinders, and wherein the remaining portion is formed at a position corresponding to a remaining one of the plurality of cylinders.

11. The utility vehicle according to claim 10, wherein:
the engine includes an oil pan in a lower portion of the crankcase,
the crankcase has an opening opened downward of the crankcase in the remaining portion and a bottom portion closing a lower side of the crankcase in the recessed portion, and
the oil pan is attached to a lower surface of the remaining portion.

12. The utility vehicle according to claim 11, wherein the crankcase has a passage for guiding lubricant guided to a bottom portion of the recessed portion to the opening of the remaining portion.

13. The utility vehicle according to claim 10, wherein:
the mount bracket is rigidly connected to the engine and is elastically connected to the vehicle body frame, and
the propeller shaft is rotatably supported by the mount bracket via a bearing.

14. The utility vehicle according to claim 10, wherein the mount bracket is connected to a side portion of the engine on an output side in an axial direction of an output shaft of the engine.

15. A utility vehicle comprising:
an engine having a crankcase supporting a crankshaft;
a propeller shaft arranged below the crankcase, and
a mount bracket for mounting the engine on a vehicle body frame,
wherein the crankcase includes a recessed portion in which a lower portion of the crankcase is recessed upward and a remaining portion excluding the recessed portion in an axial direction of the crankshaft,
wherein at least a part of the propeller shaft is arranged in a space defined below the recessed portion, and positioned further on an upper side than a lower end portion of the crankcase,
wherein the propeller shaft is supported by the mount bracket, and
wherein a rib portion connecting a lower surface of the recessed portion and a side surface on the remaining portion side of the recessed portion is formed on the lower surface of the recessed portion.

16. The utility vehicle according to claim 15, wherein:
the engine includes an oil pan in a lower portion of the crankcase,
the crankcase has an opening opened downward of the crankcase in the remaining portion and a bottom portion closing a lower side of the crankcase in the recessed portion, and
the oil pan is attached to a lower surface of the remaining portion.

17. The utility vehicle according to claim 16, wherein the crankcase has a passage for guiding lubricant guided to a bottom portion of the recessed portion to the opening of the remaining portion.

18. The utility vehicle according to claim 15, wherein:
the mount bracket is rigidly connected to the engine and is elastically connected to the vehicle body frame, and
the propeller shaft is rotatably supported by the mount bracket via a bearing.

19. The utility vehicle according to claim 15, wherein the mount bracket is connected to a side portion of the engine on an output side in an axial direction of an output shaft of the engine.

* * * * *